H. A. SCHWARTZ.
AUTOMATIC CHUCKING MACHINE.
APPLICATION FILED JULY 12, 1920.
1,404,657.
Patented Jan. 24, 1922.
19 SHEETS—SHEET 7.
Fig. 8.
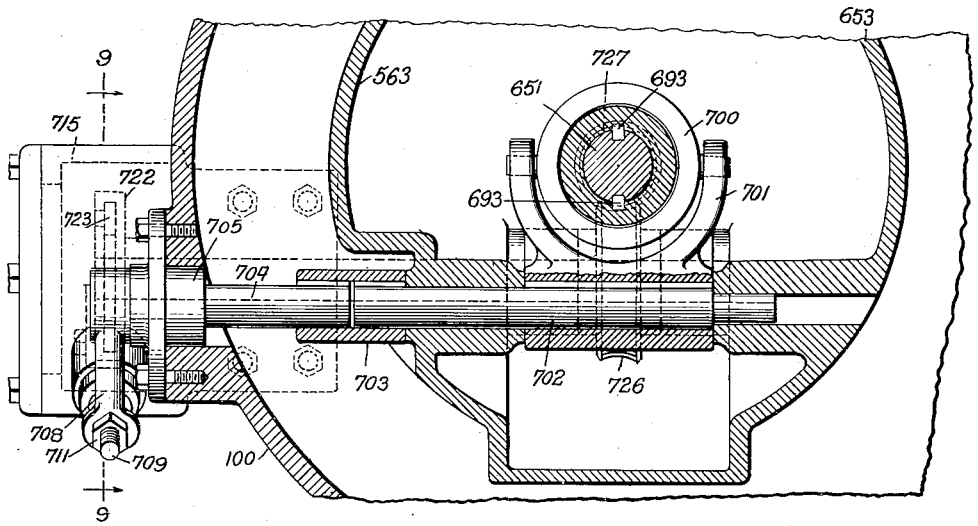
Fig. 9.
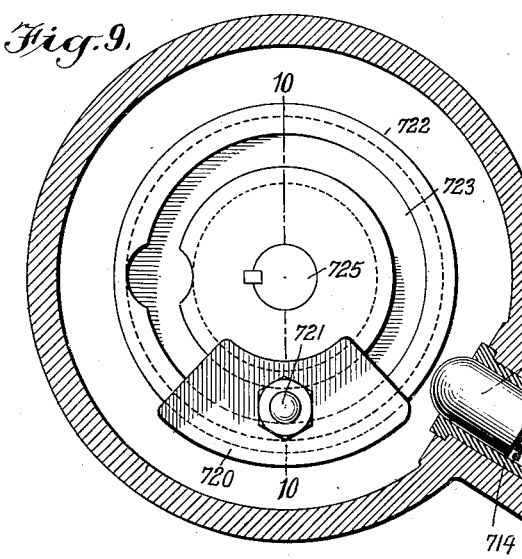
Fig. 10.
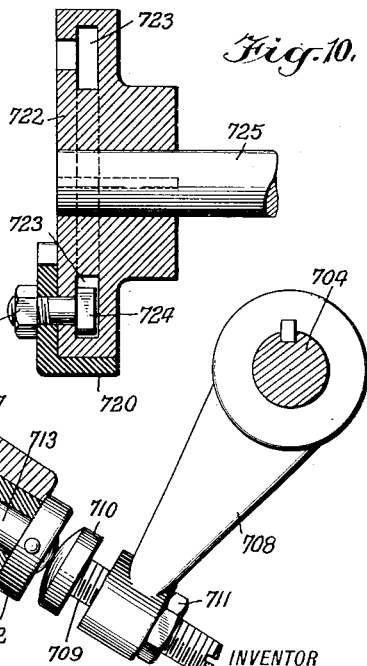
WITNESSES
INVENTOR
HARRY A. SCHWARTZ
BY 
ATTORNEYS

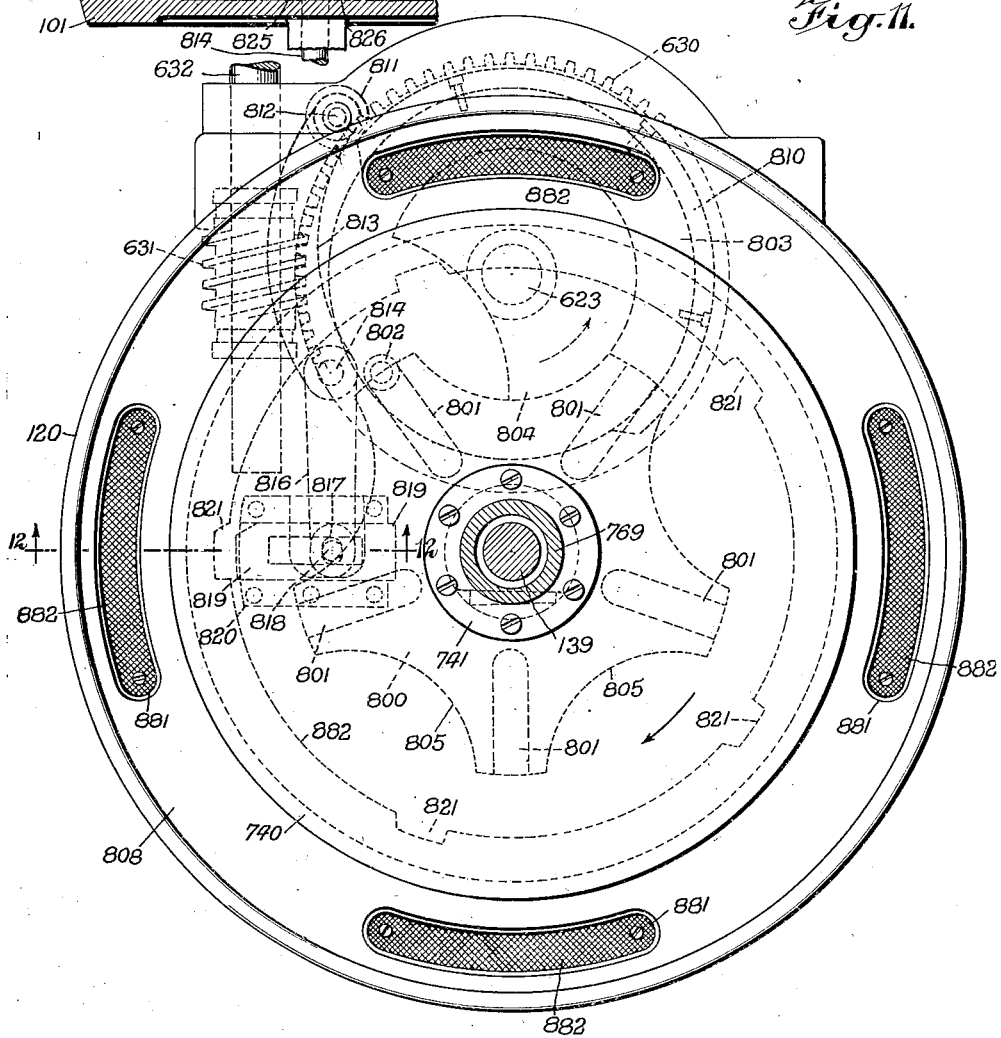

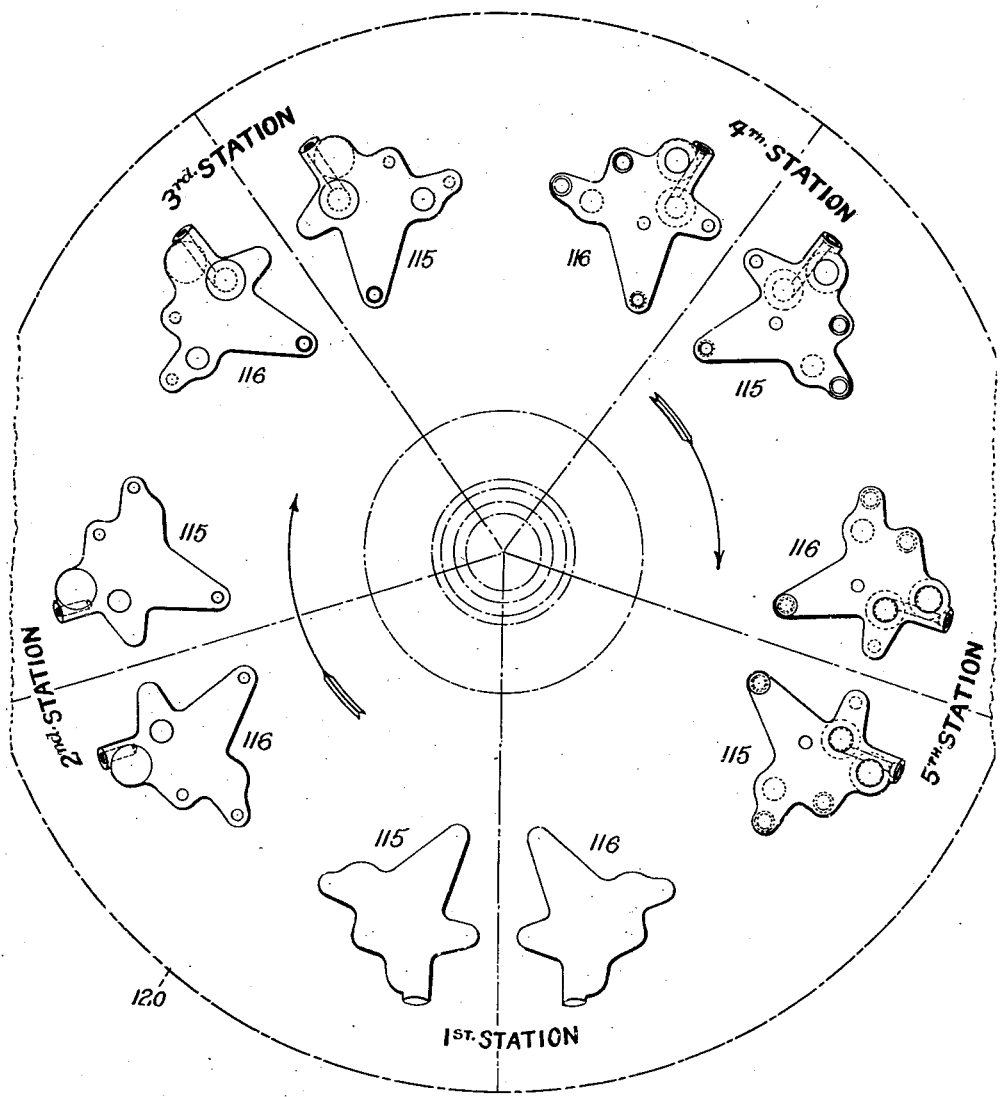

H. A. SCHWARTZ.
AUTOMATIC CHUCKING MACHINE.
APPLICATION FILED JULY 12, 1920.

1,404,657.

Patented Jan. 24, 1922.
19 SHEETS—SHEET 11.

WITNESSES

INVENTOR
HARRY A. SCHWARTZ
BY
ATTORNEYS

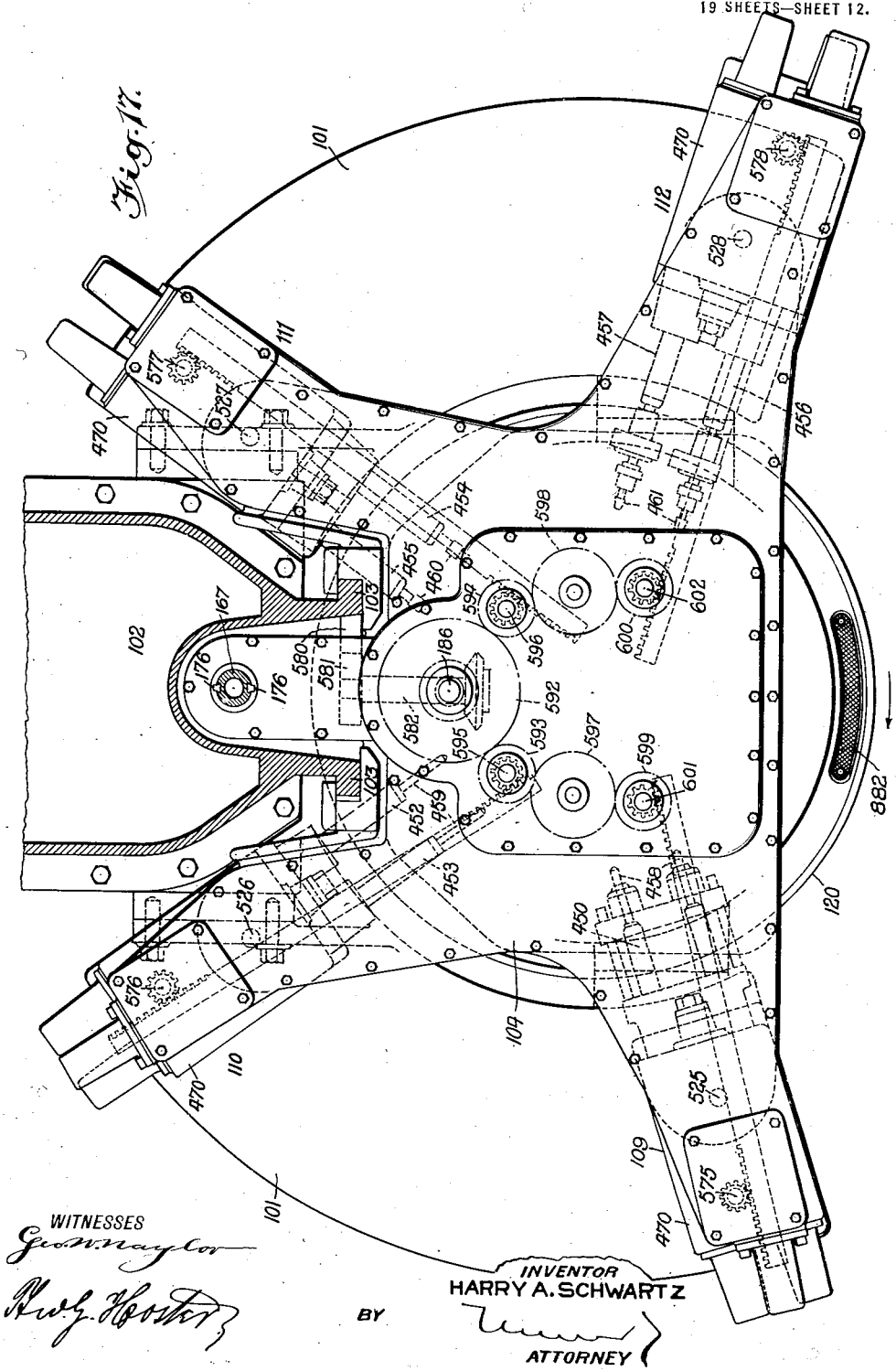

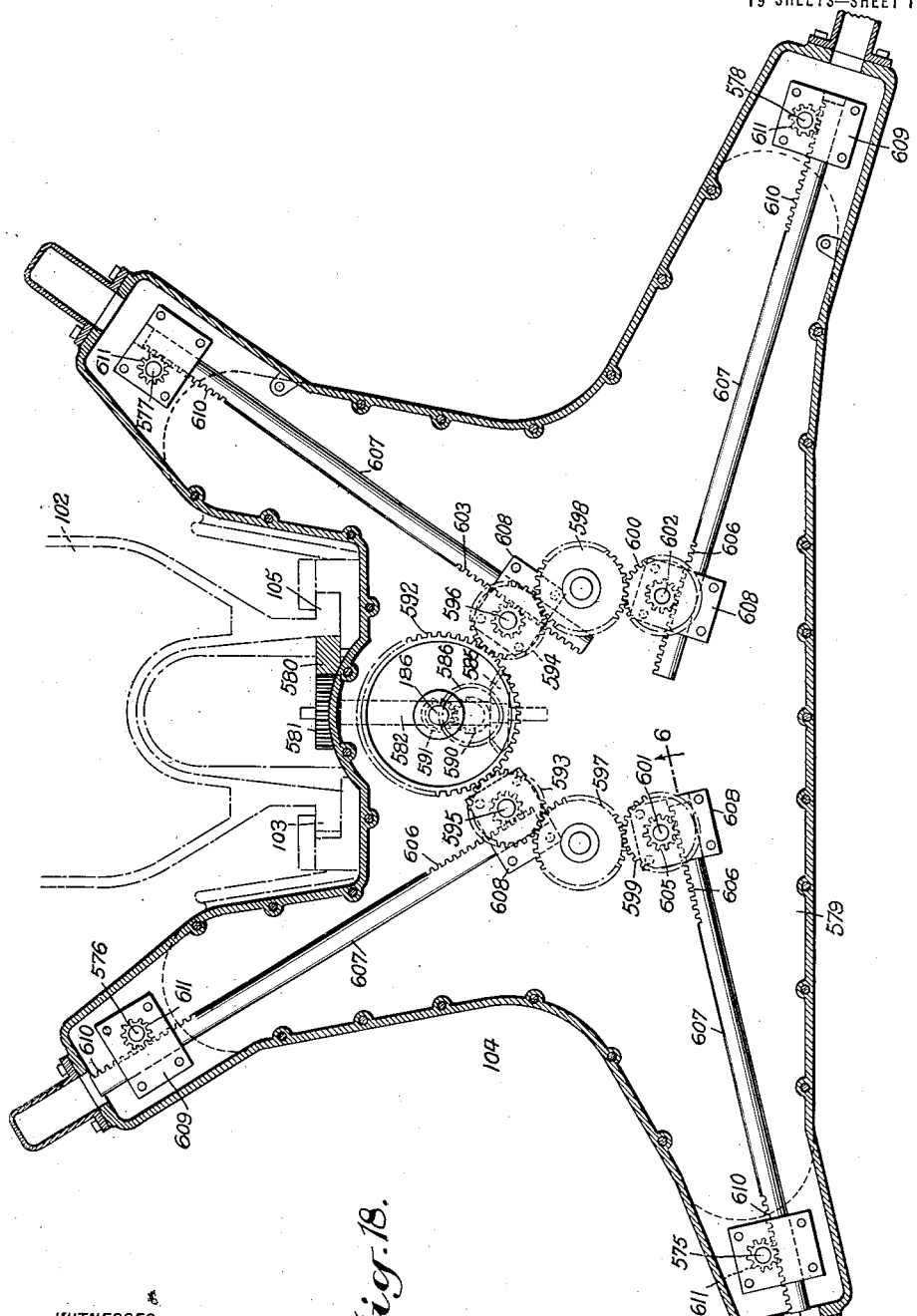

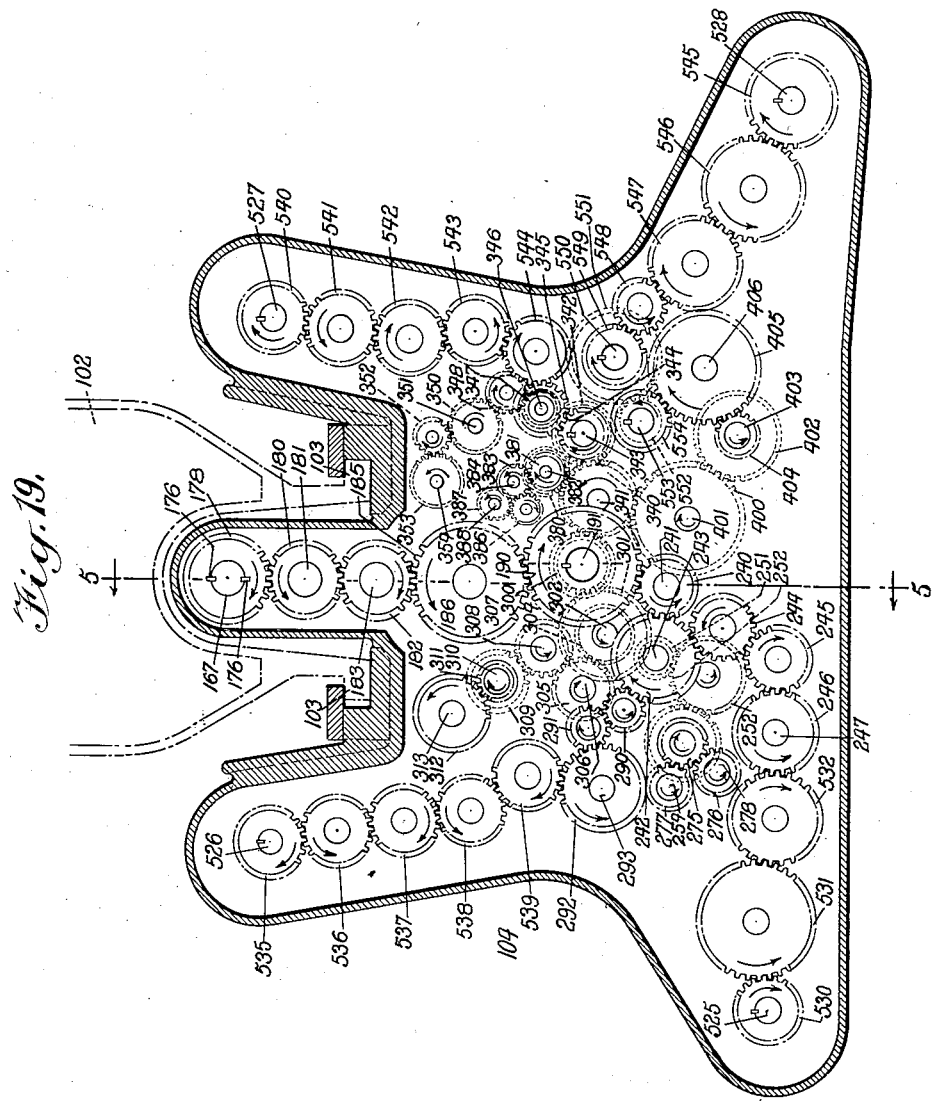

H. A. SCHWARTZ.
AUTOMATIC CHUCKING MACHINE.
APPLICATION FILED JULY 12, 1920.

1,404,657.

Patented Jan. 24, 1922.
19 SHEETS—SHEET 15.

WITNESSES

INVENTOR
HARRY A. SCHWARTZ.
BY
ATTORNEYS

H. A. SCHWARTZ.
AUTOMATIC CHUCKING MACHINE.
APPLICATION FILED JULY 12, 1920.

1,404,657.

Patented Jan. 24, 1922.
19 SHEETS—SHEET 16.

WITNESSES

INVENTOR
HARRY A. SCHWARTZ
BY
ATTORNEYS

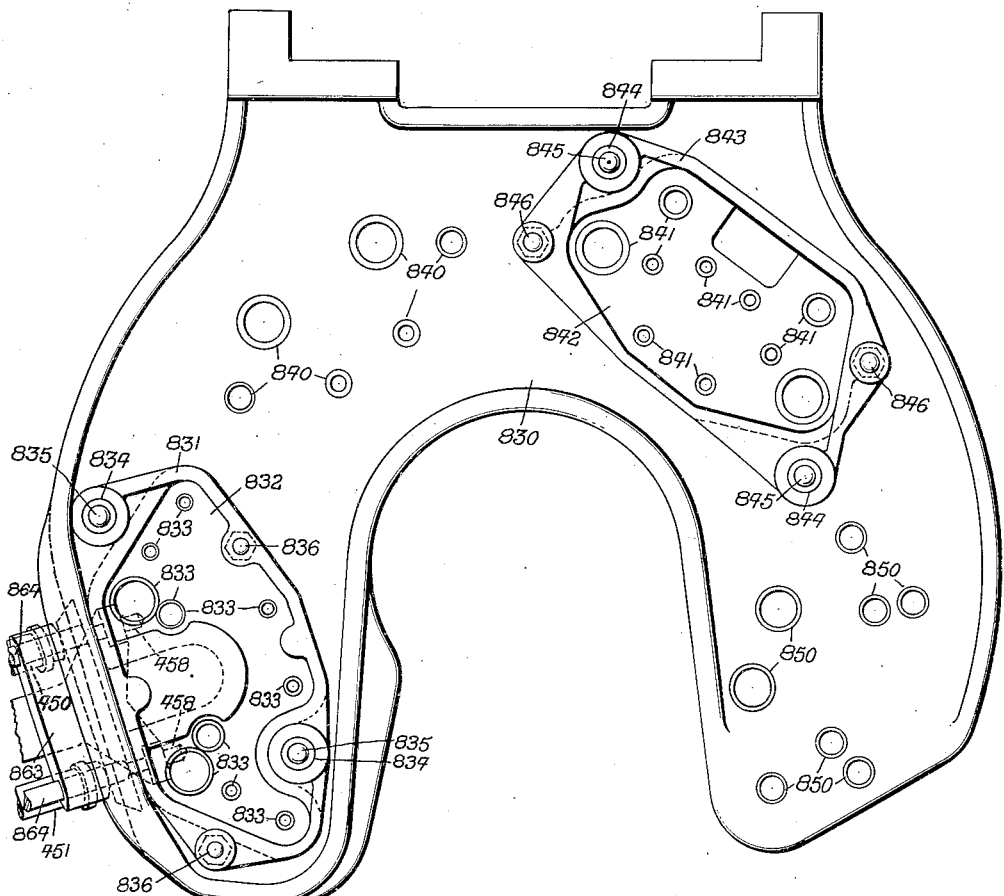
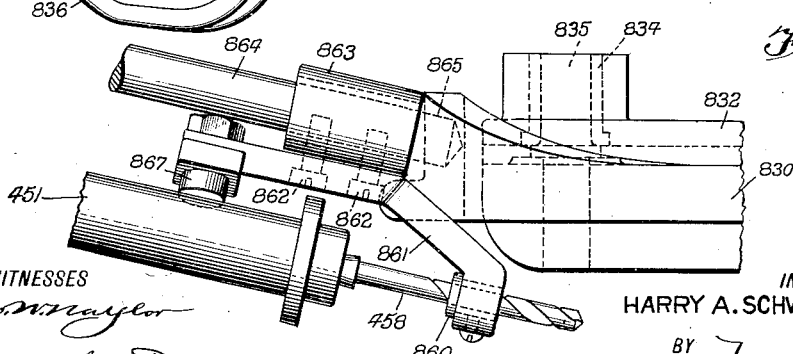

H. A. SCHWARTZ.
AUTOMATIC CHUCKING MACHINE.
APPLICATION FILED JULY 12, 1920.
1,404,657.
Patented Jan. 24, 1922.
19 SHEETS—SHEET 18.
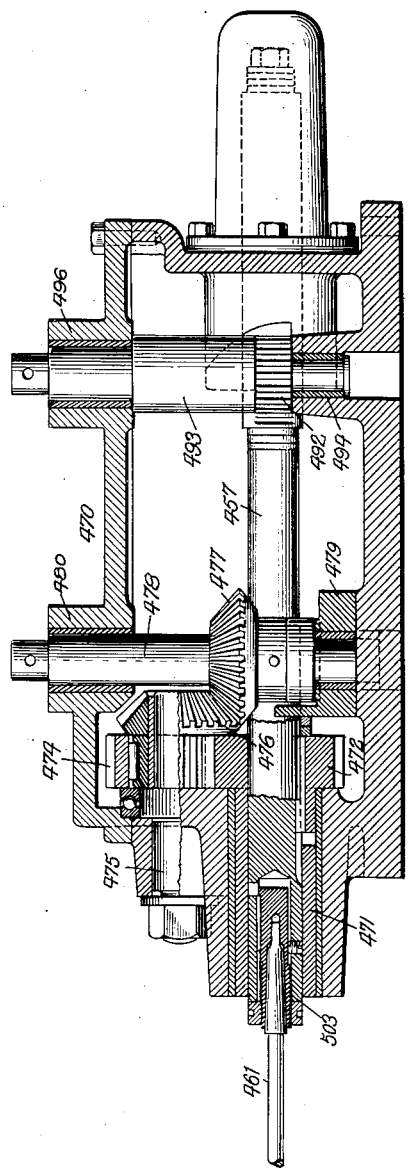
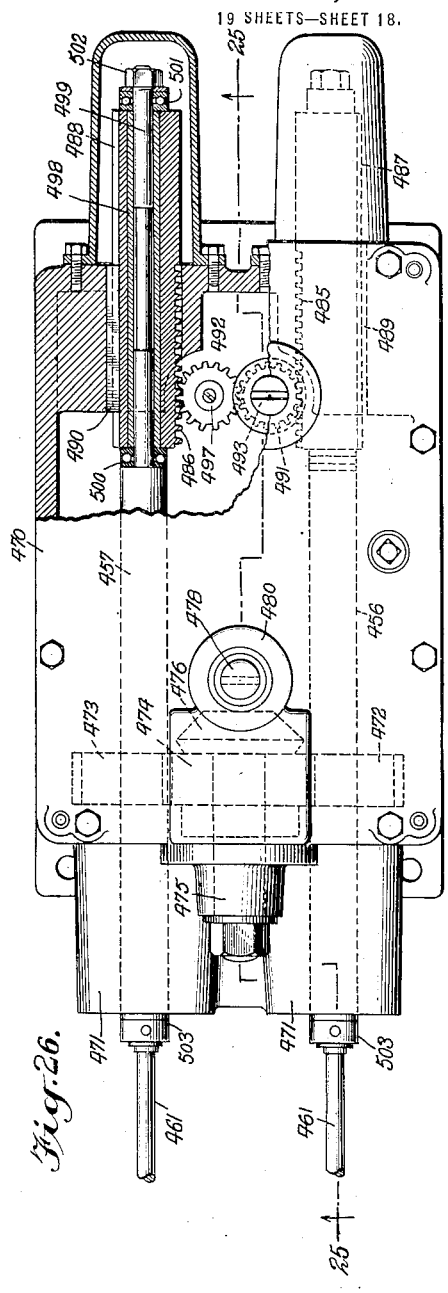
WITNESSES
INVENTOR
HARRY A. SCHWARTZ
BY
ATTORNEYS

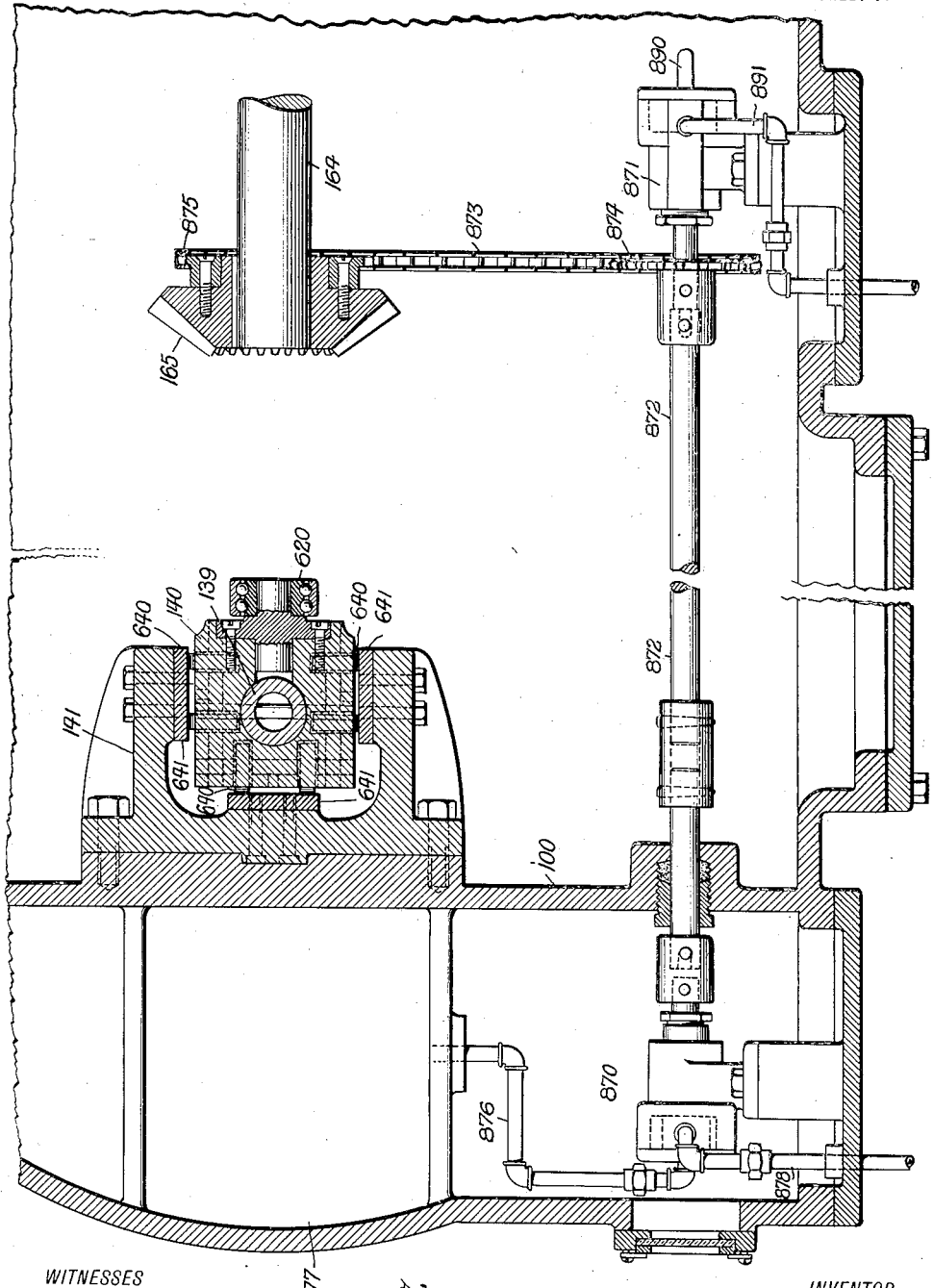

UNITED STATES PATENT OFFICE.

HARRY A. SCHWARTZ, OF DEFIANCE, OHIO, ASSIGNOR TO DEFIANCE MACHINE WORKS, OF DEFIANCE, OHIO, A CORPORATION OF OHIO.

AUTOMATIC CHUCKING MACHINE.

1,404,657.  Specification of Letters Patent.  Patented Jan. 24, 1922.

Application filed July 12, 1920.  Serial No. 395,606.

*To all whom it may concern:*

Be it known that I, HARRY A. SCHWARTZ, a citizen of the United States, and a resident of Defiance, in the county of Defiance and State of Ohio, have invented a new and Improved Automatic Chucking Machine, of which the following is a full, clear, and exact description.

The invention relates to metal working machines of the high speed production type, and its object is to provide a new and improved automatic chucking machine for carrying out on a pair of companion castings or other pieces of work a plurality of different tooling operations, such as drilling, chamfering, reaming, spot facing, tapping and the like, according to requirements and without requiring change of the position of the work in the work holder.

Another object is to permit of operating on a plurality of pairs of castings at a time at one face and at the sides in a predetermined sequence and without requiring adjustment or handling of the castings.

Another object is to turn out a large number of finished articles in a comparatively short time.

The improved automatic chucking machine in the embodiment shown in the drawings and hereinafter described in detail is designed for doing twenty-one different tooling operations on each of a pair of companion (right and left) cam shaft brackets, such as are used on internal combustion engines for automobiles, but I do not limit myself to this particular arrangement of the machine as the latter can be used with the same or with different tools for performing other tooling operations besides the ones shown and hereinafter specifically described without deviating from the spirit of my invention, it being understood that I reserve the right to resort to embodiments other than the one actually illustrated herein to the full extent indicated by the general meaning of the terms in which the claims are expressed and by variations in the phrasing of the same.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 8 is an enlarged cross section of the differential gearing on the line 8—8 of Figure 7;

Figure 9 is an enlarged sectional side elevation of the same on the line 9—9 of Figure 8;

Figure 10 is a cross section of part of the same on the line 10—10 of Figure 9;

Figure 11 is an enlarged plan view of the base of the turret with the indexing mechanism shown in dotted lines;

Figure 12 is a sectional side elevation of part of the same on the line 12—12 of Figure 11;

Figure 13 is a diagrammatic plan view of the position of the several pairs of cam shaft brackets in position on the turret and showing the tooling operations performed at each station;

Figure 17 is a plan view of the vertical spindle head with the supporting column shown in section;

Figure 18 is a sectional plan view of the upper or feeding deck of the vertical spindle head and showing more particularly the feeding mechanism for the horizontal spindles, the section being on the line 18—18 of Figure 5;

Figure 19 is a sectional plan view of the main tooling head and showing more particularly the gearing of the spindle driving mechanism, the section being on the line 19—19 of Figure 5;

Figure 23 is an enlarged plan view of the guide for the tools carried by the spindles;

Figure 24 is an enlarged side elevation of a part of the same;

Figure 25 is an enlarged sectional side elevation of one of the horizontal tooling heads, the section being on the line 25—25 of Figure 26;

Figure 26 is a plan view of the same with a portion shown in section; and

Figure 27 is an enlarged sectional plan view of the lower portion of the automatic chucking machine, the section being on the line 27—27 of Figure 1, and showing more particularly the lubricating pumps and the guide for the crosshead of the spindle head.

*General construction.*

Figure 20:
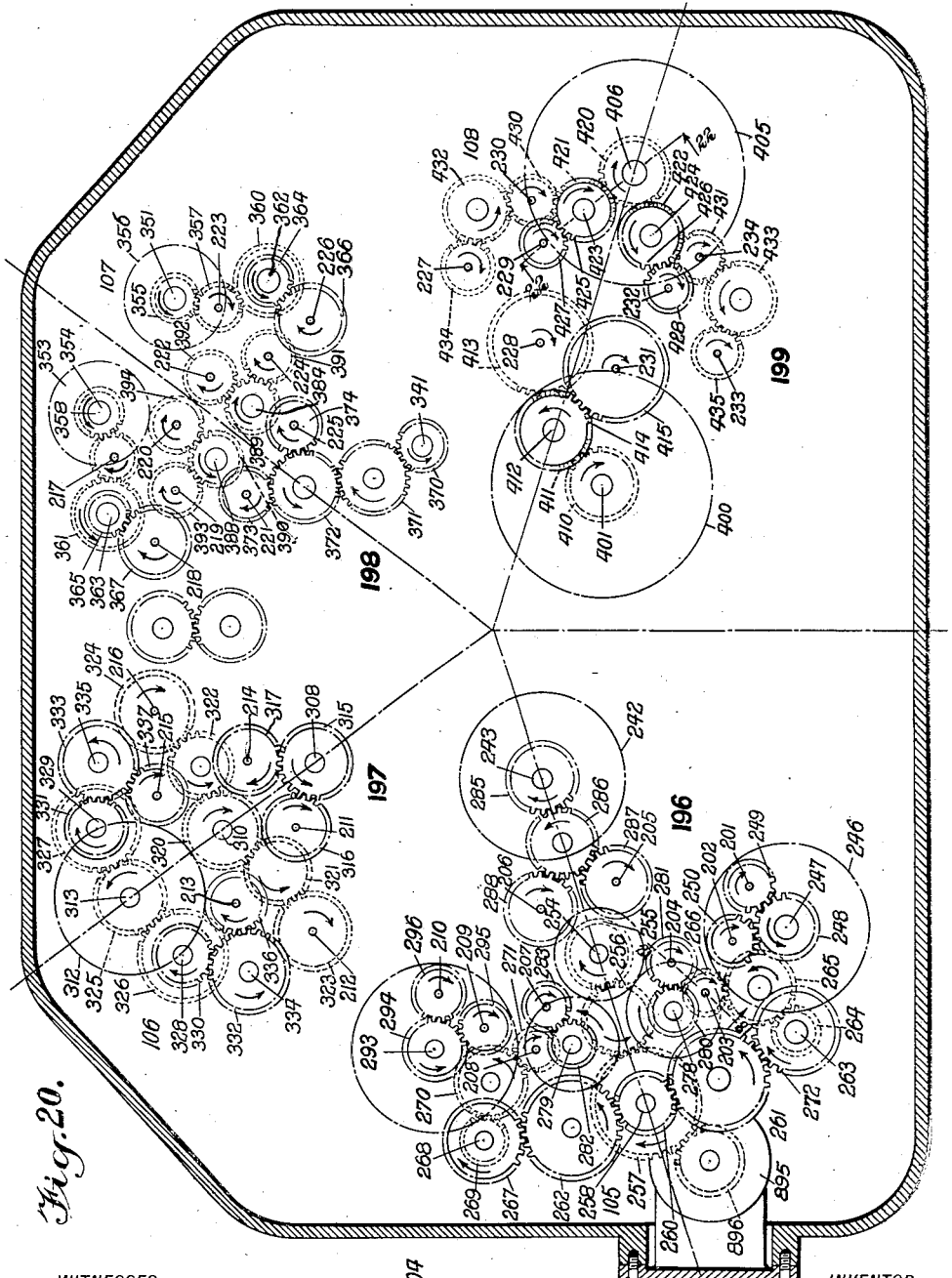
Figure 20 is a sectional plan view of the vertical spindle head and showing more particularly the sets of gearings for the several groups of vertical spindles, the section being on the line 20—20 of Figure 5.
Figure 21:
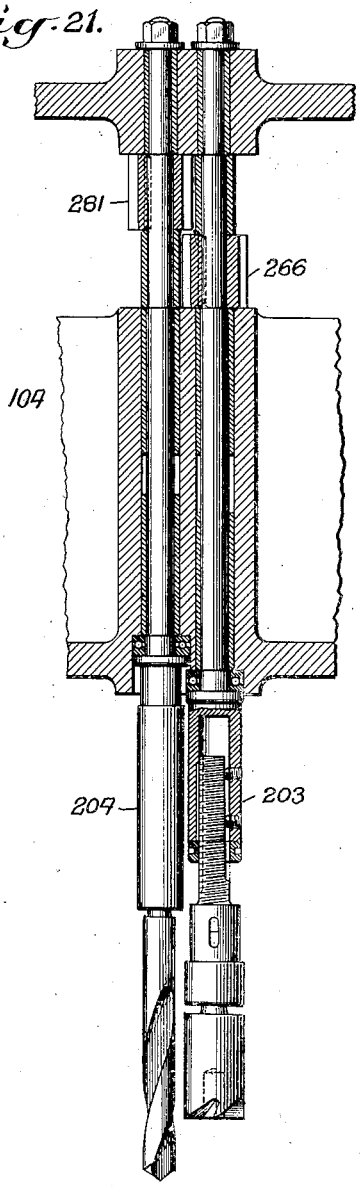
Figure 21 is an enlarged sectional side elevation of a pair of adjacent vertical spindles; the section being on the line 21—21 of Figure 20.

The improved automatic chucking machine is mounted on a suitably constructed base 100 provided with a segmental table bracket 101 and with a column 102 provided with a vertical guideway 103 on which is mounted to slide up and down a counterbalanced tooling head 104 provided with four groups of tool spindles 105, 106, 107 and 108 (see Figure 20). On the table bracket 101 is mounted a plurality of radially disposed sidewise operating tooling heads 109, 110, 111 and 112 (see Figure 17) coacting with the corresponding four groups of tool spindles 105, 106, 107 and 108 on the tooling head 104 to simultaneously finish the work, which in this particular case consists of two cam shaft brackets 115, 116 held on a horizontally disposed turret or chuck carrier 120 rotating intermittently below the tooling head 104. The tooling heads 109, 110, 111 and 112 are grouped around the turret 120 (see Figure 17) to provide at the front of the turret 120 between the tooling heads 109 and 112 an unloading and loading station for an operator to replace a pair of finished cam shaft brackets 115, 116 by a pair of raw brackets to be finished. The four groups of tool spindles 105, 106, 107 and 108 and the corresponding tooling heads 109, 110, 111 and 112 are arranged to provide four tooling stations which with the first or unloading and loading station provide the machine with five stations (see Figure 13). The turret 120 accommodates at a time five pairs of brackets 115, 116, and the said turret is given intermittently one-fifth of a revolution after each tooling operation is completed, thus presenting a pair of cam shaft brackets 115, 116 to each tooling station.

*Tooling head 104.*

Figure 1:
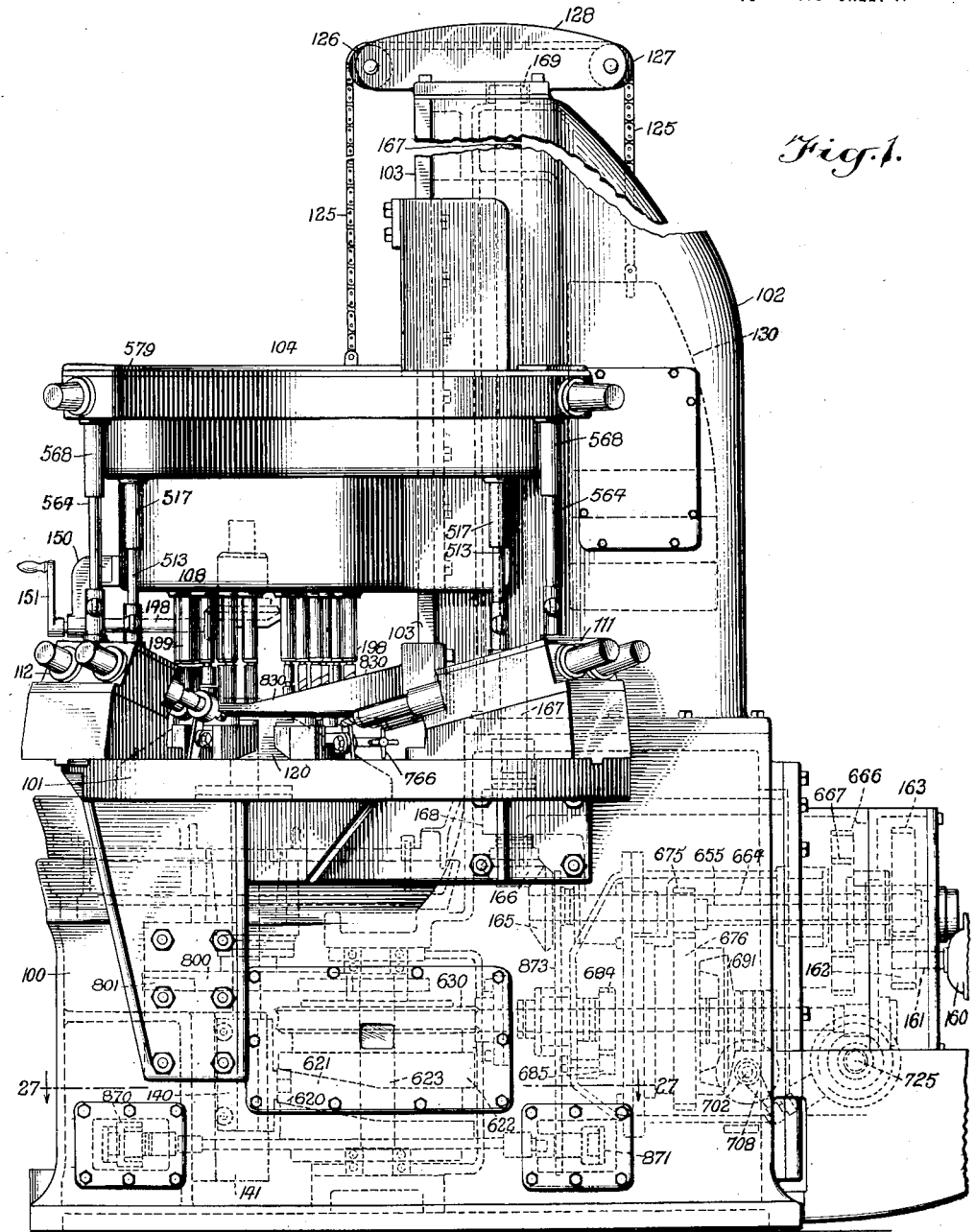
Figure 1 is an elevation of the right-hand side of the improved automatic chucking machine.
Figure 2:
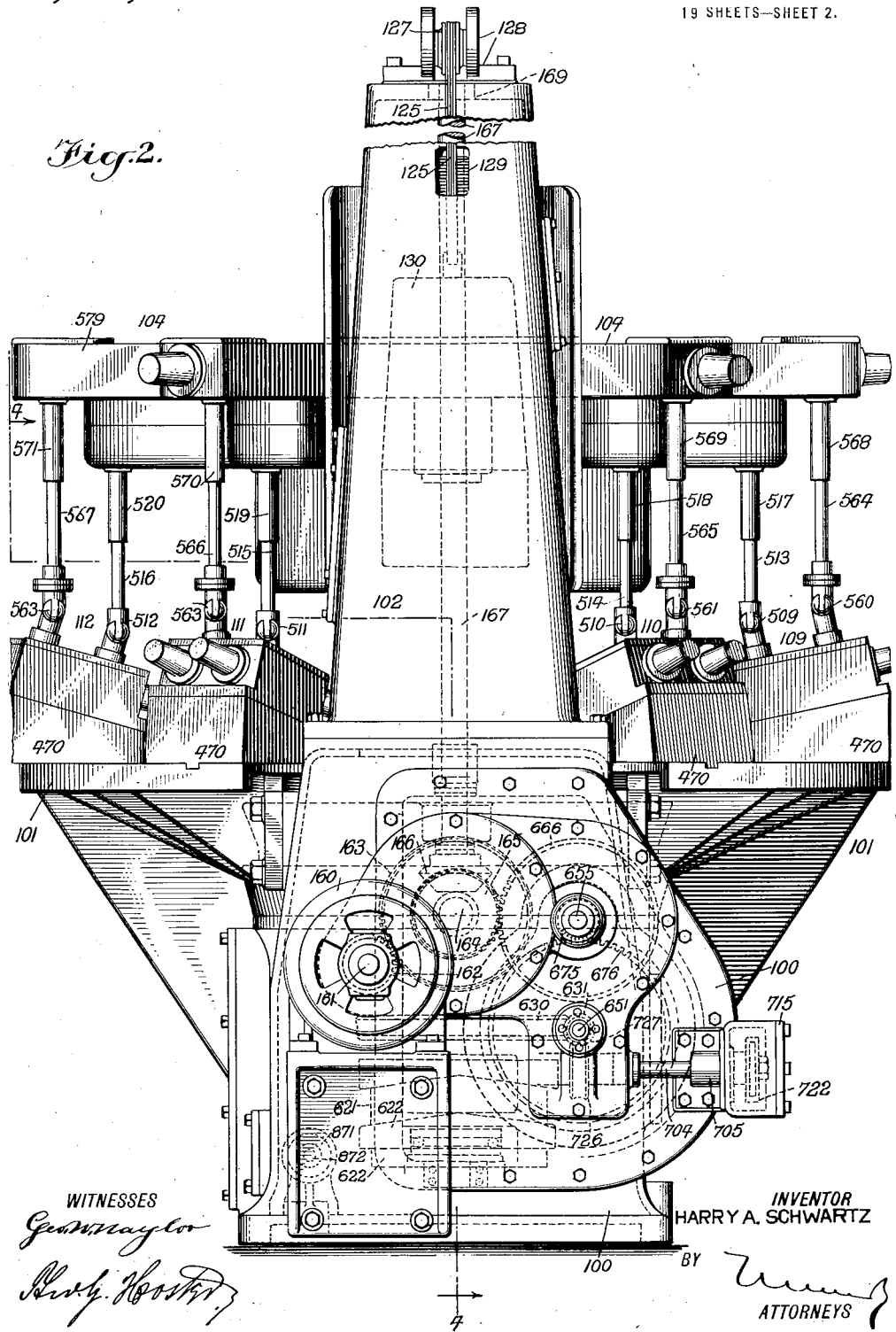
Figure 2 is a rear elevation of the same.

The tooling head 104 is hung on one end of a chain 125 extending upwardly and passing over guide pulleys 126 and 127 journaled in a bracket 128 attached to the top of the column 102 (see Figures 1 and 2). The other end of the chain 125 extends through an opening 129 into the column 102 and carries a weight 130 to counterbalance the tooling head 104 with a view to permit of moving the tooling head 104 up and down with comparatively little power. The bottom 135 of the tooling head 104 (see Figure 5) is provided with a bearing 136 in which is mounted to turn a nut 137 and in this nut 137 screws the upper threaded end 138 of a vertical rod 139 secured at its lower end in a crosshead 140 (see Figure 4) mounted to slide up and down in a guideway 141 arranged in the base 100. It will be noticed that when an up and down sliding movement is given to the crosshead 140 a like movement is given to the tooling head 104, it being understood that during the downward movement of the tooling head 104 the groups of tool spindles 105, 106, 107 and 108 are fed to and through the work, and during the return or upward movement of the said tooling head 104 the said tool spindles 105, 106, 107 and 108 are moved out of engagement with the work. It will be noticed that the supporting rod 139 centrally supports the tooling head 104, that is, the center of gravity approximately coincides with the axis of the supporting rod 139 and as the latter is parallel to the vertical guideway 103 the counterbalanced tooling head 104 slides freely up and down without danger of binding on the guideway 103, thus requiring correspondingly little power to move the tooling head 104 up or down.

In order to permit adjustment of the tooling head 104 relative to the work on the turret 120, the following arrangement is made: The nut 137 is provided with a reduced lower end 145 projecting below the bottom 135 of the tooling head 104 and on this reduced end 145 is secured a bevel gear wheel 146 in mesh with a bevel pinion 147 secured on a horizontally disposed shaft 148 journaled in suitable bearings arranged on brackets 149, 150 secured to the tooling head 104, as will be readily understood by reference to Figures 4 and 5. On the outer end of the shaft 148 is secured a handle or crank arm 151 under the control of an operator for turning the shaft 148 with a view to rotate the bevel gear wheels 147, 146 and the nut 137 to move the tooling head 104 upward or downward on the threaded end 138 of the rod 139 according to the direction in which the crank arm or handle 151 is turned at the time. By the arrangement described the tooling head 104 can be readily adjusted up or down on the rod 139 wholly independent of the up and down reciprocating movement given to the crosshead 140.

*Main drive.*

On the rear of the base 100 (see Figures 1 and 2) is mounted a motor 160, preferably of the electric type, and having a horizontally disposed motor shaft 161 provided with a pinion 162 in mesh with a gear wheel 163 secured on a main shaft 164 journaled in the base 100. On the main shaft 164 is secured a bevel gear wheel 165 in mesh with a bevel gear wheel 166 secured on the lower end of a vertically disposed shaft 167 journaled in bearings 168 and 169, preferably of the roller type, and of which the bearing 168 is arranged on a housing 170 located within and attached to the base 100, and the bearing 169 is arranged in the upper portion of the column 102. The bearing 168 is provided with a step ball bearing 171 for an enlarged portion 172 of the shaft 167 to rest on thus supporting the shaft 167 in a vertical position (see Figure 4). The shaft 167 extends through the rear of the tooling head 104 (see Figure 5) and is provided with diametrically opposite keyways 175 engaged by keys 176 secured in the hub 177 of a gear wheel 178 having its said hub journaled in the tooling head 104 to move up and down with the tooling head 104, and of which the said gear wheel 178 forms the initial driving member for driving the spindles of the several groups of tool spindles 105, 106, 107 and 108, presently described in detail. The gear wheel 178 (see Figures 5 and 19) is in mesh with the gear wheel 180 mounted to turn on a stud shaft 181 held on the head 104, and this gear wheel 180 is in mesh with a gear wheel 182 mounted to rotate on a similar stud shaft 183. The gear wheel 182 is in mesh with a gear wheel 185 mounted to rotate loosely on the main feed shaft 186 for the tool spindles on the tooling heads 109, 110, 111 and 112 hereinafter more fully described. The gear wheel 185 is in mesh with a gear wheel 190 keyed or otherwise secured on a master shaft 191 journaled in the head 104 and geared with gear sets 196, 197, 198 and 199 for driving the spindles of the groups of tool spindles 105, 106, 107, 108 as well as for driving the spindles in the tooling heads 109, 110, 111, 112.

*Spindles.*

Figure 3:
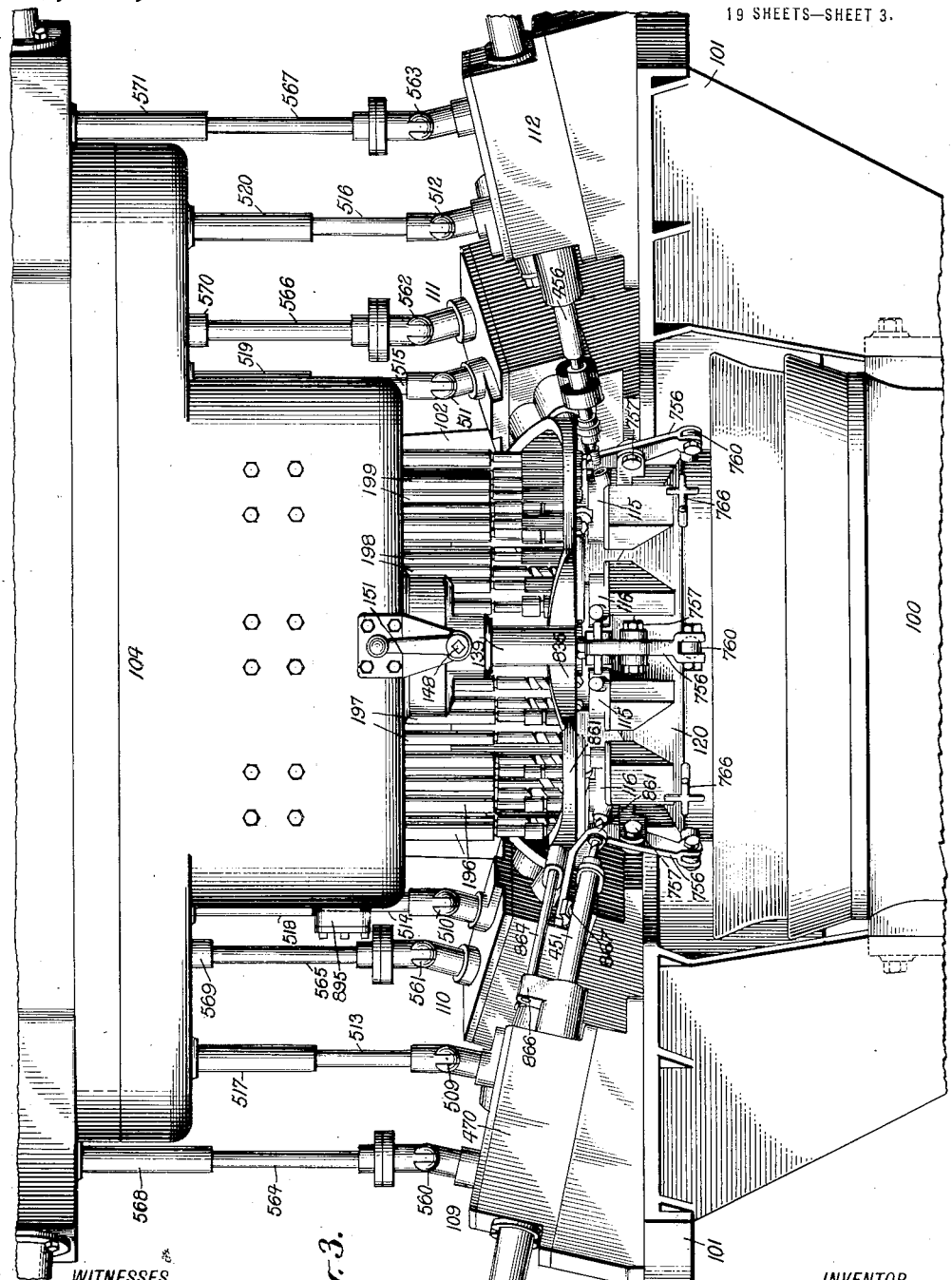
Figure 3 is an enlarged fragmentary front elevation of the same.

For tooling the cam shaft brackets 115 and 116 at station II the group of tool spindles 105 comprises ten spindles 201, 202, 203, 204, 205, 206, 207, 208, 209 and 210, of which eight are for carrying drills for boring four holes in each cam shaft bracket 115, 116, and two spindles (203, 208) carry spot facing tools for facing corresponding portions of the cam shaft brackets 115, 116, as indicated in Figure 3 at station II. For tooling the cam shaft brackets 115, 116 at station III the group of tool spindles 106 comprises six spindles 211, 212, 213, 214, 215, 216, of which two spindles (212, 216) carry drills for drilling one additional hole in each cam shaft bracket 115, 116, two spindles (211 and 214) carry chamfering tools for chamfering two holes previously drilled at station II, and two spindles (213, 215) carry spot facing tools for spot facing corresponding portions on the two cam shaft brackets 115, 116, as will be readily understood by reference to station III on Figure 13. For tooling the cam shaft brackets 115, 116 at station IV, the group of tool spindles 107 comprises ten spindles 217, 218, 219, 220, 221, 222, 223, 224, 225 and 226, of which the spindles 217, 219, 220, 222, 223 and 224 carry drills for drilling three holes in each of the cam shaft brackets 115, 116, two spindles (221 and 225) carry reamers for reaming previously drilled holes in the cam shaft brackets, and two spindles (218 and 226) carry spot facing tools for spot facing corresponding portions on the cam shaft brackets 115, 116, as will be readily understood by reference to station IV, Figure 13. For tooling the cam shaft brackets 115, 116 at station V the group of tool spindles 108 comprises spindles 227, 228, 229, 230, 231, 232, 233 and 234, of which the spindles 227, 229, 230, 232, 233 and 234 carry reaming tools for reaming previously drilled holes, and the spindles 228 and 231 carry spot facing tools for correspondingly spot facing portions of the cam shaft brackets 115, 116 (see station V, Figure 13.)

*Gearset 196.*

In order to drive the group of tool spindles 105 at station II from the master shaft 191, the gearset is provided arranged as follows: The gear wheel 190 is in mesh with a gear wheel 240 (see Figure 19) on a shaft 241 and in mesh with a gear wheel 242 on a shaft 243. The gear wheel 242 is in mesh with a gear wheel 244 in mesh with a gear wheel 245 in mesh with a gear wheel 246 secured on a shaft 247. This shaft 247 is provided with a gear wheel 248 (see Figure 20) in mesh with two gear wheels 249, 250 secured on the tool spindles 201, 202 to drive the same in unison and in the same direction, as indicated by the arrows in Figure 20.

In order to rotate the spindles 203 and 208 carrying spot facing tools, the following arrangement is made: On the shaft 243 is secured a pinion 251 (see Figure 19) in mesh with a gear wheel 252 in mesh with a gear wheel 253 secured on a shaft 254. On the shaft 254 is secured a gear wheel 255 (see Figure 20) in mesh with a gear wheel 256 in mesh with a gear wheel 257 secured on a shaft 258. On the shaft 258 is secured a gear wheel 260 in mesh at opposite sides with gear wheels 261 and 262, of which the gear wheel 261 is in mesh with a gear wheel 272 secured on a shaft 263 carrying a gear wheel 264 in mesh with a gear wheel 265 in mesh with a gear wheel 266 secured on the spindle 203. The gear wheel 262 above mentioned is in mesh with a gear wheel 267 secured on a shaft 268 provided with a gear wheel 269 in mesh with a gear wheel 270 in mesh with a gear wheel 271 secured on the spindle 208. It will be noticed that the two trains of gear wheels connecting the gear wheel 260 with the gear wheels 261 and 271 rotate the spindles 203 and 208 at the same speed and in the same direction.

In order to rotate the spindles 204 and 207, the following arrangement is made: On the shaft 254 (see Figure 19) is secured a gear wheel 275 in mesh with two gear wheels 276, 277 secured on shafts 278 and 279. On the shaft 278 (see Figure 20) is secured a gear wheel 280 in mesh with a gear wheel 281 secured on the spindle 204. On the shaft 279 (see Figure 20) is secured a gear wheel 282 in mesh with a gear wheel 283 secured on the spindle 207. It will be noticed that by the two trains of gear wheels just described the spindles 204 and 207 are rotated at the same speed and in the same direction.

In order to rotate the spindles 205 and 206 in unison, the following arrangement is made: On the shaft 243 (see Figure 20) is secured a gear wheel 285 in mesh with a gear wheel 286 in mesh with gear wheels 287, 288 secured on the spindles 205, 206, respectively, to rotate the same at the same speed and in the same direction.

In order to rotate the spindles 209 and 210, the following arrangement is made: The gear wheel 242 on the shaft 243 besides being in mesh with the gear wheel 244 is in mesh with a gear wheel 290 (see Figure 19) in mesh with a gear wheel 291 in mesh with a gear wheel 292 secured on a shaft 293. On the shaft 293 (see Figure 20) is secured a gear wheel 294 in mesh with gear wheels 295 and 296 secured on the spindles 209 and 210 to rotate the same at the same speed and in the same direction.

From the foregoing it will be seen that the spindles 201 to 210 are rotated simultaneously in the same direction and with the spindles 203 and 208 driven at a lower rate of speed than the other spindles in this group of spindles 105.

Gearset 197.

The gearset 197 for the group of tool spindles 106 at Station III is driven from the master shaft 191, and for this purpose the following arrangement is made: On the master shaft 191 (see Figure 19) is secured a gear wheel 300 in mesh with a gear wheel 301 secured on a shaft 302 provided with a gear wheel 304 in mesh with a gear wheel 305 secured on a shaft 306. The gear wheel 305 is in mesh with a gear wheel 307 secured on a shaft 308, and the gear wheel 307 is also in mesh with a gear wheel 309 secured on a shaft 310 on which is secured a gear wheel 311 in mesh with a gear wheel 312 secured on a shaft 313. On the shaft 308 (see Figure 20) is secured a gear wheel 315 in mesh with gear wheels 316, 317 secured on the spindles 211, 214 carrying drills. The shaft 310 is provided with a gear wheel 320 (see Figure 20) in mesh with gear wheels 321 and 322 in mesh with gear wheels 323, 324, secured on the spindles 212 and 216 likewise carrying drills. On the shaft 313 is secured a gear wheel 325 (see Figure 20) in mesh with gear wheels 326 and 327 secured on shafts 328, 329 carrying gear wheels 330, 331 in mesh with gear wheels 332, 333 secured on shafts 334, 335. The gear wheels 332, 335 are in mesh with gear wheels 336 and 337 secured on the spindles 213 and 215 carrying spot facing tools. It will be noticed that by the arrangement described the several spindles 211, 212, 213, 214, 215 and 216 at station III are rotated in unison with the spindles 213, 215 driven at a lower rate of speed than the other spindles of this group of tool spindles 106.

Gearset 198.

The gearset 198 for the group of tool spindles 107 at station IV is driven from the master shaft 191 and for this purpose the following arrangement is made: The gear wheel 300 on this shaft 191 (see Figure 19) is in mesh with a gear wheel 340 secured on a shaft 341, and this gear wheel 340 is in mesh with a gear wheel 342 on the shaft 343 provided with a gear wheel 344 in mesh with a gear wheel 345 secured on a shaft 346. On the shaft 346 is secured a gear wheel 347 in mesh with an intermediate gear wheel 348 in mesh with a gear wheel 350 secured on a shaft 351. The gear wheel 350 is also in mesh with an intermediate gear wheel 352 in mesh with a gear wheel 353 secured on a shaft 354. On the shafts 351 and 354 (see Figure 20) are secured gear wheels 355 and 356 in mesh with gear wheels 357 and 358 secured on the spindles 223 and 217 to rotate the same. The gear wheels 357 and 358 are in mesh with gear wheels 360 and 361 secured on shafts 362, 363 on which are secured gear wheels 364, 365 in mesh with gear wheels 366, 367 secured on the spindles 226 and 218 carrying the spot facing tools, as previously mentioned.

The spindles 221 and 225 (see Figure 20) are driven from the shaft 341 previously mentioned, and for this purpose the shaft 341 is provided with a gear wheel 370 in mesh with a gear wheel 371 in mesh with a gear wheel 372 in mesh with gear wheels 373 and 374 secured on the spindles 221 and 225 to rotate the same in unison and in the same direction. It is understood that the spindles 221 and 225 carry reamers which are driven at a higher speed than the spindles carrying drills.

In order to rotate the spindles 219, 220, 222 and 224, the following arrangement is made: On the shaft 341 previously mentioned (see Figure 19) is secured a gear wheel 380 in mesh with a gear wheel 381 secured on a shaft 382. The gear wheel 381 is in mesh with a gear wheel 383 secured on a shaft 384, and on the shaft 382 is also secured a gear wheel 385 in mesh with an intermediate gear wheel 386 in mesh with a gear wheel 387 secured on a shaft 388. On the shafts 384, 388 (see Figure 20) are secured gear wheels 389, 390 of which the gear wheel 389 is in mesh with gear wheels 391 and 392 secured on the spindles 224 and 222 to rotate the same in unison and in the same direction. The gear wheel 390 is in mesh with gear wheels 393 and 394 secured on the spindles 219 and 220 to rotate the same in unison and in the same direction, it being understood that the spindles 219, 220, 222 and 224 carry drills and rotate in unison at the same speed and in the same direction.

*Gearset 199*

Figure 22:
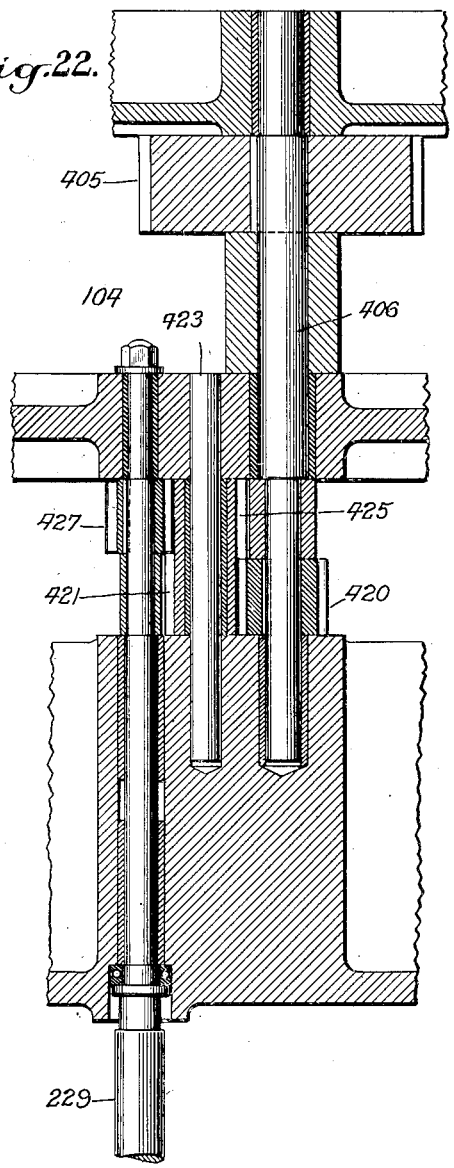
Figure 22 is a similar view of the driving mechanism for one of the vertical spindles; the section being on the line 22—22 of Figure 20.

The gearset 199 for the group of tool spindles 108 at station V is driven from the master shaft 191 and for this purpose the following arrangement is made: The gear wheel 340 on the shaft 341 previously mentioned (see Figure 19) is in mesh with a gear wheel 400 secured on a shaft 401 and is in mesh with a gear wheel 402 secured on a shaft 403 provided with a pinion 404 in mesh with a gear wheel 405 secured on a shaft 406. On the shaft 401 (see Figure 20) is secured a gear wheel 410 in mesh with a gear wheel 411 secured on a shaft 412, and the gear wheel 411 is in mesh with a gear wheel 413 secured on the spindle 228. On the shaft 412 is secured a gear wheel 414 in mesh with a gear wheel 415 secured on the spindle 231. It will be noticed that the spindles 228 and 231 are rotated in unison and in the same direction, and the said spindles carry spot facing tools, as previously mentioned. The reamer-carrying spindles 227, 229, 230, 233 and 234 are driven from the shaft 406, as before mentioned, and for this purpose the following arrangement is made (see Figure 20): On the shaft 406 is secured a gear wheel 420 in mesh with gear wheels 421, 422 mounted to turn loosely on stud shafts 423, 424 and having extension gear wheels 425, 426 (see Figure 22) in mesh with gear wheels 427 and 428 secured on the drill spindles 229 and 232. The gear wheels 421 and 422 are in mesh with gear wheels 430 and 431 secured on the drill spindles 230 and 231, and the said gear wheels 430 and 431 are in mesh with intermediate gear wheels 432, 433 in mesh with gear wheels 434, 435 secured on the drill spindles 227 and 233. It is understood that by the gearing described the spindles 228 and 231 carrying spot facing tools are rotated at a lower rate of speed than the reamer-carrying spindles 227, 229, 230, 232, 233 and 234, but all the spindles rotate simultaneously in the same direction.

*Tooling heads 109, 110, 111 and 112.*

Figure 15:
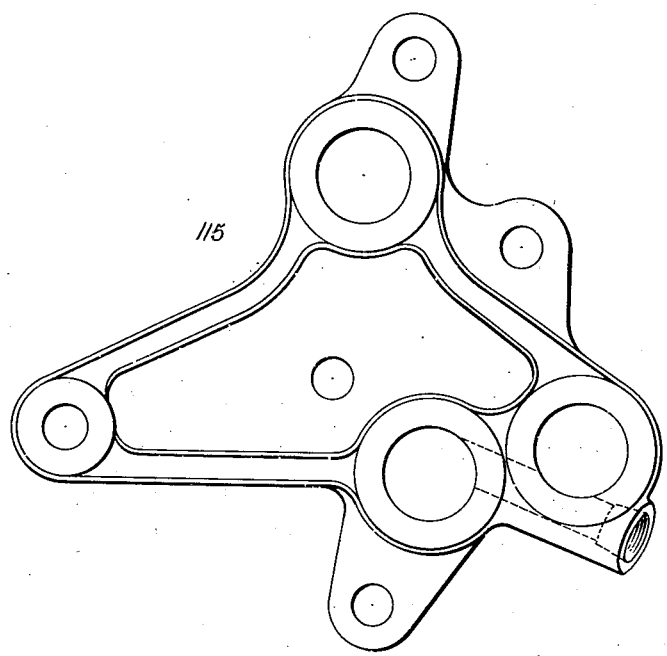
Figure 15 is an enlarged plan view of one of the finished cam shaft brackets.
Figure 16:
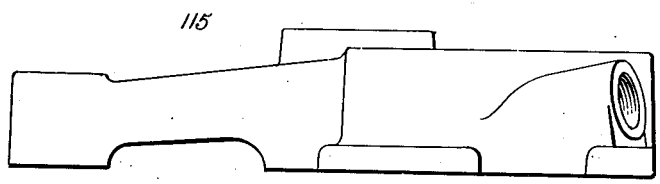
Figure 16 is a side elevation of the same.

The tooling heads 109, 110, 111 and 112 at the corresponding stations II, III, IV and V (see Figure 17) are each provided with tool spindles 450, 451; 452, 453; 454, 455; and 456, 457; respectively. The spindles 450 and 451 are adapted to carry short drills 458 for drilling holes in the sides of the cam shaft brackets 115, 116 (see Figure 13, station II); the spindles 452, 453 carry longer drills 459 for deepening the side holes previously drilled by the drills 458 (see Figure 13, station III); the spindles 454, 455 are adapted to carry countersinking tools 460 for countersinking the outer ends of the side holes (see Figure 13, station IV); and the spindles 456, 457 are adapted to carry tapping tools 461 for tapping the countersunk portions of the side holes in the cam shaft brackets 115, 116 at station V (see Figure 15). Each of the tapping tools 461 is provided with retractible taps and is, preferably, similar to the tapping tool shown and described in the Letters Patent of the United States, No. 1,200,180 granted to Franklin A. Errington on October 3, 1916, so that further description of the same is not deemed necessary. The several spindles of the tooling heads 109, 110, 111 and 112 are slightly inclined to the horizontal plane of the turret 120 to provide the cam shaft brackets 115, 116 with correspondingly inclined tapped holes at the sides.

The tooling heads 109, 110, 111 and 112 are alike in construction and hence it suffices to describe but one in detail, special reference being had to Figures 25 and 26. The housing 470 for each tooling head 109, 110, 111 and 112 is bolted or otherwise secured to the top of the table bracket 101 and in the inner end of the housing 470 are arranged bearings 471 in which are journaled the corresponding pair of spindles 450, 451; 452, 453; 454, 455; or 456, 457. On the spindles within the housing 470 are secured gear wheels 472, 473 in mesh with a gear wheel 474 mounted to rotate on a stud 475 attached to the front end of the housing 470. On the gear wheel 474 is secured a bevel gear wheel 476 in mesh with a bevel gear wheel 477 secured on a vertically disposed shaft 478 mounted at its lower end in a stepped bearing 479 and journaled near its upper end in a bearing 480 arranged on the top of the housing 470. The outer ends of the spindles in each housing 470 are provided with tubular racks 485, 486 provided with keyways 487, 488 engaged by keys 489, 490 attached to the housing to allow the racks 485, 486 to slide lengthwise in the housing but to hold the same against turning with the corresponding spindles. The racks 485, 486 are in mesh with gear wheels 491 and 492 in mesh with each other, as indicated in Figure 26, and the gear wheel 491 is secured on a vertically disposed shaft 493 mounted at its lower end in a stepped bearing 494 journaled at its upper end in a bearing 496 arranged in the top of the housing 470. The gear wheel 492 is mounted to turn on a stud 497 arranged in the bottom of the housing 470. It will be noticed that when the shaft 478 is turned, a rotary motion is given simultaneously to the two spindles in the corresponding housing 470, and on rotating the shaft 493 a feeding movement is given to the two spindles either inward or outward according to the direction in which the shaft 493 is turned at the time. Each of the racks 485, 486 is provided with a bushing 498 in which is mounted to rotate the reduced outer end 499 of the corresponding spindle in the housing 470, and at the ends of the reduced portion 499 are arranged ball bearings 500 and 501 engaging the ends of the corresponding rack 485 or 486. A nut 502 screws on the outer end of the reduced portion 499 against the bearing 501 to hold the corresponding rack 485, 486 on the corresponding spindle to move the same either inward or outward according to the direction in which the racks 485, 486 are moved at the time. The inner ends of the spindles in the housings are provided with suitable tool holders 503 for detachably holding the corresponding tools 458, 459, 460 or 461, as will be readily understood by reference to Figure 5. It is expressly understood that the shaft 478 in each housing 470 is the driving shaft for the corresponding spindles in such housing while the shaft 493 is the feed shaft for imparting a feeding movement to the said spindles.

*Driving gear for the tooling heads 109, 110, 111 and 112.*

Figure 6:
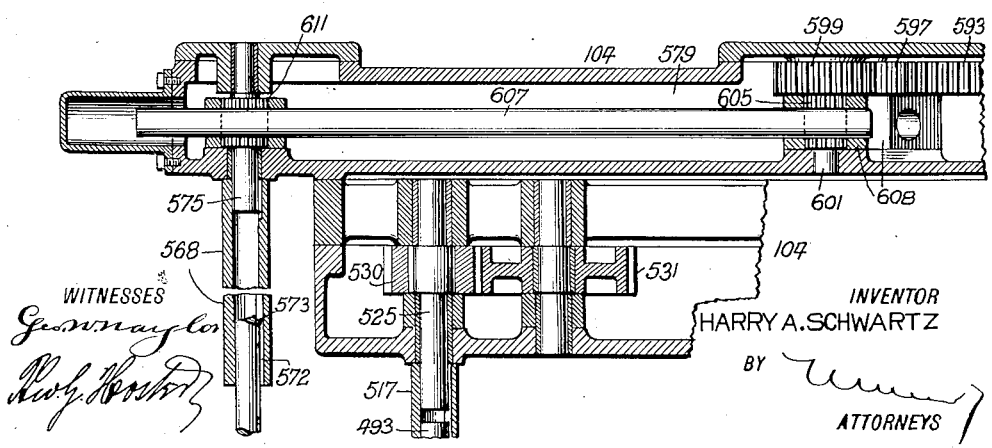
Figure 6 is an enlarged side elevation of one of the feed mechanisms for the horizontal spindle, the section being on the line 6—6 of Figure 18.

The upper ends of the driving shafts 478 for the tooling heads 109, 110, 111 and 112 are connected by universal couplings 509, 510, 511 and 512 (see Figure 2) with upright shafts 513, 514, 515 and 516, slidably and rotatably connected at their upper ends with sleeves 517, 518, 519 and 520 by the use of keys and keyways 521, as shown in Figure 6. The upper ends of the sleeves 517, 518, 519 and 520 are keyed or otherwise secured to shafts 525, 526, 527 and 528 journaled in the tooling head 104 (see Figures 6 and 19). The shaft 525 (see Figure 19) is connected by a train of gear wheels 530, 531 and 532 with the gear wheel 246, previously mentioned, and secured on the driven shaft 247. The shaft 526 is connected by a train of gear wheels 535, 536, 537, 538 and 539 with the gear wheel 292 on the driven shaft 293 before mentioned. The shaft 527 is connected by a train of gear wheels 540, 541, 542, 543 and 544 with the gear wheel 345, previously mentioned. The shaft 528 is connected by a train of gear wheels 545, 546, 547, 548 and 549 with a shaft 550 journaled in the tooling head 104, and this shaft 550 is connected by a train of gear wheels 551 and 552 with a shaft 553 carrying a gear wheel 554 in mesh with the gear wheel 405, previously mentioned, and secured on the driven shaft 406. It will be noticed that by the trains of gear wheels described, the shafts 525, 526, 527 and 528 for driving the spindles in the tooling heads 109, 110, 111 and 112 are driven from the gearsets in the tooling head 104.

*Feeding gear for the tooling heads 109, 110, 111 and 112.*

The upper ends of the feed shafts 493 of the several tooling heads 109, 110, 111 and 112 (see Figure 2) are connected by universal couplings 560, 561, 562 and 563 with vertical shafts 564, 565, 566 and 567 slidably and rotatably connected at their upper ends with sleeves 568, 569, 570 and 571 by the use of keys 572 and keyways 573, as plainly shown in Figure 6. The upper ends of the sleeves 568 are keyed or otherwise secured to shafts 575, 576, 577 and 578 journaled in suitable bearings in the upper portion 579 of the tooling head 104 (see Figures 6, 17 and 18).

The several shafts 575, 576, 577 and 578 are automatically turned alternately in opposite directions in harmony with the up and down movement of the tooling head 104, and for this purpose the following arrangement is made, special reference being had to Figures 5, 6, 17 and 18: On the column 102 adjacent the back of the tooling head 104 is secured a vertically disposed rack 580 in mesh with a gear wheel 581 secured on a horizontally disposed shaft 582 journaled in suitable bearings 583, 584 arranged on the lower portion of the tooling head 104, as plainly shown in Figure 5. It will be noticed that when the tooling head 104 moves up and down a rotary motion is given to the shaft 582 alternately in forward and backward directions by the gear wheel 581 in mesh with the fixed rack 580. On the shaft 582 is secured a bevel gear wheel 585 in mesh with a bevel gear wheel 586 secured on the lower end of a vertically disposed shaft 587 journaled in the tooling head 104. On the shaft 587 is secured a gear wheel 590 in mesh with a gear wheel 591 secured on the shaft 186, previously mentioned, and journaled in the tooling head 104. The shaft 186 extends into the upper portion 579 of the tooling head 104, and on the upper end of this shaft 186 is keyed or otherwise secured a gear wheel 592 in mesh with gear wheels 593, 594 (see Figure 18) secured on shafts 595, 596 journaled in the upper portion 579 of the tooling head 104. The gear wheels 593, 594 are connected by intermediate gear wheels 597, 598 with gear wheels 599, 600 secured on vertical shafts 601, 602 journaled in the upper portion 579 of the tooling head 104. By the gearing described, the shafts 601, 595, 596 and 602 are alternately driven in opposite directions during the up and down movement of the tooling head 104.

The forward and backward turning movement given to the shafts 601, 595, 596 and 602 is transmitted to the corresponding shafts 575, 576, 577 and 578 and for this purpose transmitting means are employed which are alike for each pair of companion shafts so that it suffices to describe but one in detail. On each shaft 601, 595, 596 and 602 is secured a gear wheel 605 in mesh with a rack 606 formed on a rack bar 607 mounted to slide in bearings 608, 609 arranged in the upper portion 579 of the tooling head 104. Each rack bar 607 is provided with a rack 610 in mesh with a pinion 611 secured on the corresponding shaft 575, 576, 577, 578 and hence the latter are rotated in unison with the shafts 601, 595, 596 and 602.

Crosshead actuating mechanism.

Figure 4:
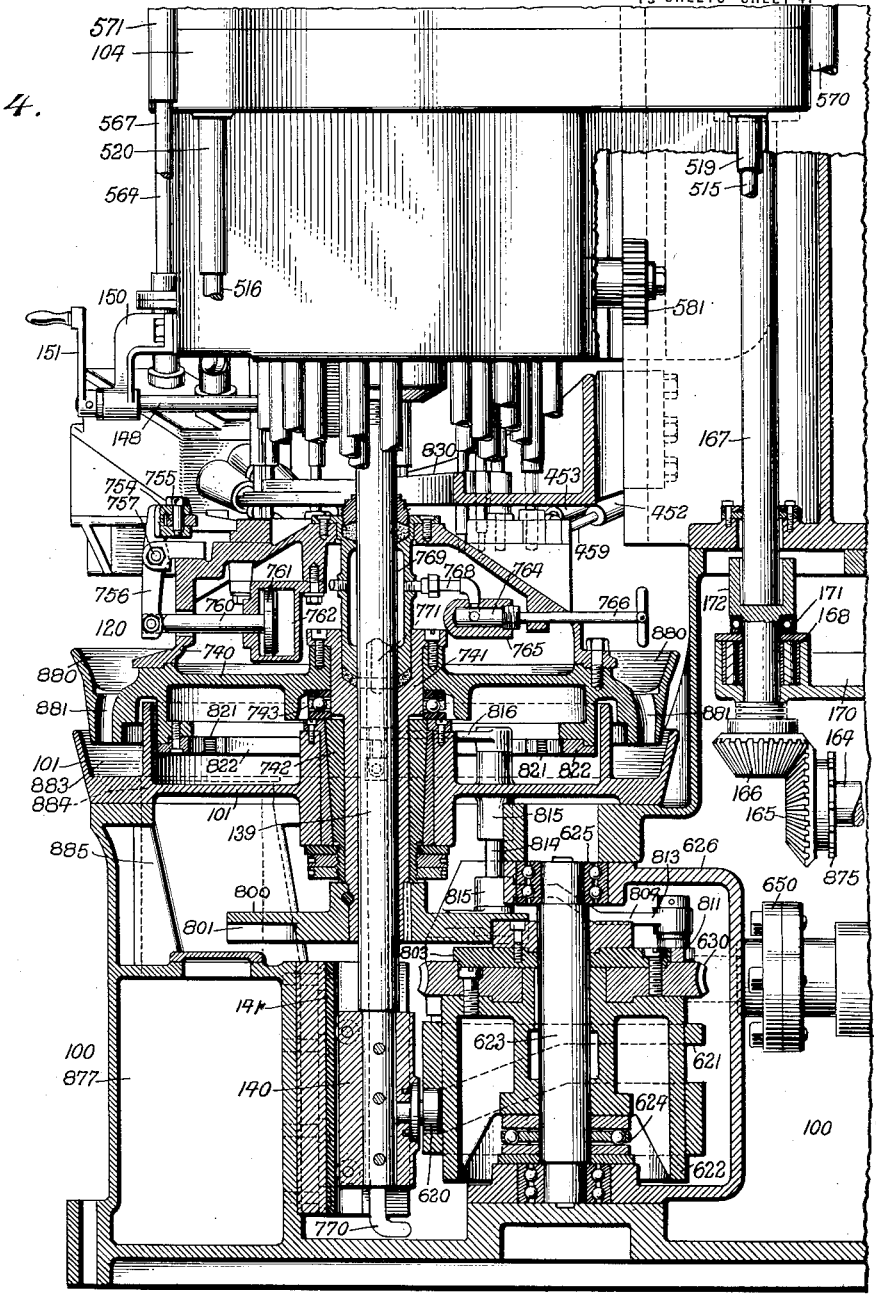
Figure 4 is a sectional side elevation of the improved automatic chucking machine on the line 4—4 of Figure 2, part of the vertical spindle head being shown broken away.
Figure 5:
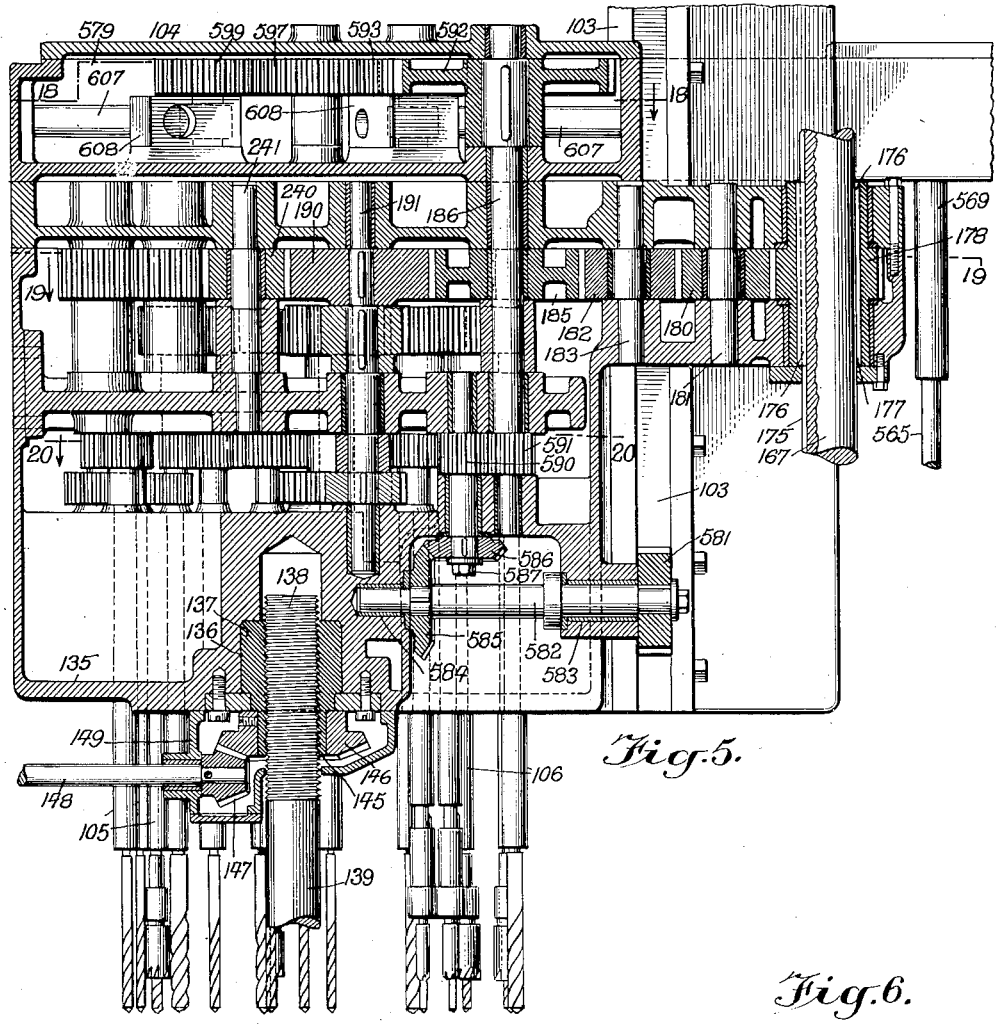
Figure 5 is an enlarged sectional side elevation of the vertical spindle head on the line 5—5 of Figure 19.
Figure 7:
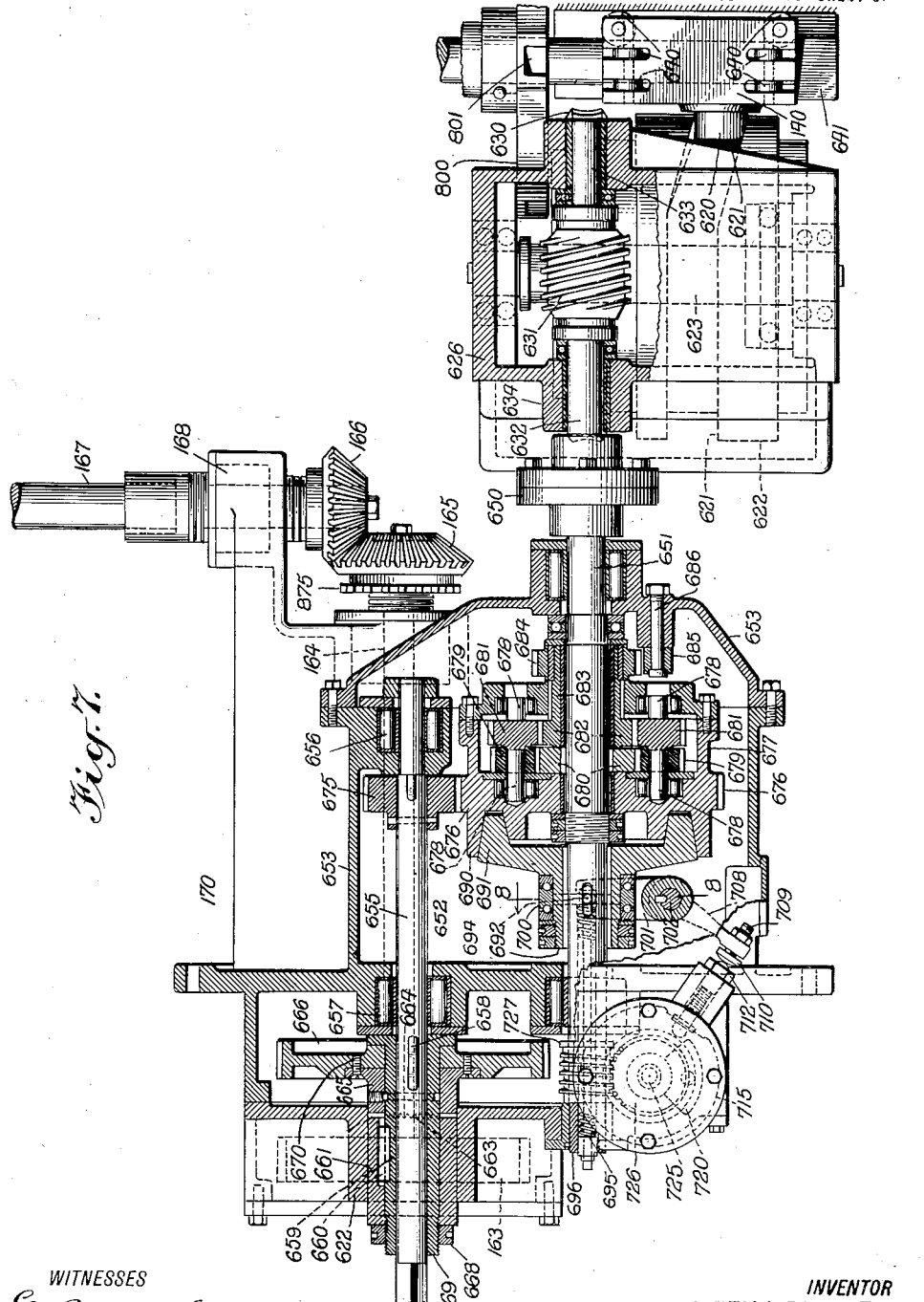
Figure 7 is an enlarged sectional side elevation of the differential gearing and the means for moving the vertical spindle head up and down, parts being shown in elevation.

In order to move the crosshead 140 and consequently the tooling head 104 up and down the following arrangement is made, special reference being had to Figures 4 and 7: On the crosshead 140 is arranged a friction roller 620 engaging a cam groove 621 formed in the peripheral face of a cam 622 keyed or otherwise fastened to a vertically disposed cam shaft 623 journaled in suitable bearings 624, 625 arranged in a housing 626 located in the base 100 and forming part thereof. On the cam 622 is secured a worm wheel 630 in mesh with a worm 631 secured on a horizontally disposed shaft 632 journaled in suitable bearings 633, 634 arranged in the housing 626. It will be noticed that when the shaft 632 is rotated then its rotary motion is transmitted by the worm 631 and the worm wheel 630 to the cam 622 which by its connection with the friction roller 620 and crosshead 140 imparts an upward and downward sliding motion to the crosshead 140 and hence to the supporting rod 139 and the tooling head 104. The crosshead 140 is preferably provided at three faces with pairs of friction rollers 640 (see Figure 27) traveling on corresponding wear plates 641 forming part of the guideway 141 for the crosshead 140. It is understood that the friction roller 620 is journaled on the fourth side of the crosshead 140. By the arrangement described the crosshead 140 is properly guided in its up and down movement in the guideway 141 and friction is reduced to a minimum owing to the use of the rollers 640 and the wear plates 641.

Differential gearing.

The worm shaft 632 of the actuating mechanism for the crosshead 140 is connected by a coupling 650 (see Figure 7) with the main shaft 651 of a differential gearing 652 (see particularly Figures 7, 8, 9 and 10), mounted in a housing 653 arranged within the base 100 and forming part thereof. The differential gearing 652 is provided with a countershaft 655 journaled in suitable bearings 656, 657 arranged in the housing 653 and of the usual roller type. The shaft 655 is connected by a key 658 or other fastening means with a sleeve 659, and this sleeve is fastened by a key 660 or other fastening means to a collar 661 mounted to turn in a bearing 662 arranged on the housing 653. The inner end of the collar 661 is provided with teeth 663 engaging teeth 664 formed on the hub 665 of a gear wheel 666, the said hub 665 fitting onto the sleeve 659. The gear wheel 666 is in mesh with a gear wheel 667 secured on the main shaft 164 and hence the rotary motion of the latter is transmitted by the gear wheels 667, 666 to the collar 661, the sleeve 659 and the shaft 655 to rotate the latter. The outer end of the collar 661 is engaged by a nut 668 screwing on the outer threaded end 669 of the sleeve 659 to hold the teeth 663 of the collar 661 in engagement with the teeth 664 of the hub 665 of the gear wheel 666. It will be noticed that on partly unscrewing the nut 668 the collar 661 can be moved outward out of engagement with the hub 665 to allow of turning the shaft 655 independently of the gear wheel 666 for making proper adjustment to correctly drive the differential gearing with a view to move the tooling head 104 at the proper time in an up and down direction. When the adjustment has been made the collar 661 is returned to re-engage the hub 665, after which the nut 668 is screwed up to hold the collar in place and thus provide a direct connection between the gear wheel 666 and the shaft 655. A set screw 670 screws in the hub 665 against the sleeve 659 to provide an additional fastening means for the gear wheel 666.

On the shaft 655 is secured a pinion 675 in mesh with a gear wheel 676 forming part of a housing 677 and mounted to rotate loosely on the shaft 651. On the gear wheel 676 are journaled a plurality of shafts 678 arranged parallel to the shaft 651 and located in a circle, the center of which coincides with the axis of the shaft 651. On each of the shafts 678 is mounted to rotate loosely a pinion 679 in mesh with a central gear wheel 680 keyed or otherwise secured to the shaft 651. On each shaft 678 is formed or secured a pinion 681 in mesh with a gear wheel 682 having its head 683 mounted to turn loosely on the shaft 651. On the hub 683 of the gear wheel 682 is keyed or otherwise secured a ratchet wheel 684 engaged by a gravity pawl 685 fulcrumed on a stud 686 attached to the housing 653. It is understood that the device just described forms a planetary gearing of the usual type for reducing the transmision of the rotary motion from the gear wheel 676 to the shaft 651, as hereinafter more fully explained. The pawl 685 is provided with a counterweight to normally hold the pawl in engagement with the ratchet wheel 684 to hold the latter against return movement.

On the gear wheel 676 is formed a friction clutch member 690 adapted to be engaged by a friction clutch member 691 having its hub 692 mounted to turn with and to slide lengthwise on the shaft 651 by the use of keys 693. The hub 692 is provided with a pin 694 engaged by a spring-pressed rod 695 arranged centrally in a bore 696 in the shaft 651. This arrangement tends to move the clutch member 691 into engagement with the clutch member 690. The gear wheel 676 is driven by the pinion 675 at a high speed and when the clutch member 691 is in engagement with the clutch member 690 then the gear wheel 676 rotates the shaft 651 at a high speed owing to the connection of the clutch member 691 with the shaft 651. When the clutch member 691 is thrown out of engagement with the clutch member 690 then the rotary movement of the gear wheel 676 is transmitted by the planetary gearing described to the shaft 651 at a low rate of speed. It is understood that the gear wheel 682 is held stationary by the ratchet wheel 684 and the pawl 685, and as the shafts 678 are carried around by the gear wheel 676, the pinions 681 are rotated by being in mesh with the stationary gear wheel 682, and this rotary motion of the pinions 681 causes the pinions 679 to rotate while being carried around with the shafts 678 thus imparting a slow rotary motion to the gear wheel 680 keyed to the shaft 651.

In order to move the friction clutch member 691 periodically out of engagement with the clutch member 690, the following arrangement is made: On the hub 692 of the friction clutch member 691 is mounted a shifting ring 700 engaged by a shifting fork 701 secured on a transverse shaft 702 journaled in the housing 653, as plainly shown in Figure 8. The shaft 702 is connected by a coupling 703 with a shaft 704 which thus forms a continuation of the shaft 702. The shaft 704 extends through a bearing 705 arranged on the base 100, and on the outer end of the shaft 704 is secured an arm 708 in which is adjustably mounted the threaded stem 709 of a button 710. A nut 711 screwing on the threaded stem 709 locks the latter in position on the arm 708 after the button 710 is adjusted to the correct position and relative to a button 712 provided with a stem 713 mounted to slide in a bearing 714 arranged on a housing 715 attached to the base 100. The stem 713 of the button 712 terminates in a head 716 pressed on by one end of a spring 717 held in the bearing 714. The inner rounded-off end of the head 716 is adapted to be engaged by a cam 720 adjustably fastened by a bolt 721 on a disk 722 having an annular groove 723 slidingly engaged by the head 724 (see Figure 10) of the bolt 721. The cam disk 722 is secured on a shaft 725 journaled in the housing 715 and on this shaft is secured a worm wheel 726 in mesh with a worm 727 secured on the shaft 651. When the shaft 651 is rotating then a rotary motion is transmitted by the worm 727 to the worm 726 to rotate the shaft 725 and consequently the cam disk 722 carrying the cam 720. During each revolution of the cam disk 722 the cam 720 engages the head 716 of the button 712 whereby the button is moved downwardly and outwardly, and as this button is in engagement with the button 710 it is evident that a swinging movement is given to the arm 708. This movement of the arm 708 causes the shifting shaft 704 to rock whereby its shifting arm 701 actuates the shifting collar 700 to move the friction clutch member 691 out of engagement with the friction clutch member 690. The friction clutch member 691 is held out of engagement with the friction clutch member 690 as long as the cam 720 is in engagement with the head 716 of the button 712, and during this time the shaft 651 is rotated at a low rate of speed from the gear wheel 676 by the planetary gearing above referred to and shown in Figure 7. As soon as the cam 720 moves out of engagement with the head 716 of the button 712 then the latter returns to normal position by the action of its spring 717 and the shifting mechanism for the clutch member 691 now allows return movement of the latter by the action of the spring-pressed rod 695. It is understood that as soon as the clutch member 691 engages the clutch member 690 then the shaft 651 is rotated at a high speed by the gear wheel 676, that is, during the time the cam 720 is out of engagement with the head 716 of the nut 712. During the time that the cam 720 is in engagement with the head 716 of the button 712 the tooling head 104 is on the downward stroke with the tools on the spindles of the several groups of spindles 105, 106, 107, 108 in engagement with the work. Thus during the time the tools are tooling the cam shaft brackets 115, 116 the downward feeding movement of the tooling head 104 is slow but as soon as the tools have accomplished their work the cam 720 moves out of engagement with the head 716 of the button 712 to return the tooling head 104 at a high speed in an upward direction and again downward until the tools reach the work at the next action of the tooling head. It is understood that for tooling different work a longer or shorter cam 720 is used to feed the tooling head 104 a longer or shorter distance at a low rate of speed for a given time.

*Work holding turret 120.*

Figure 14:
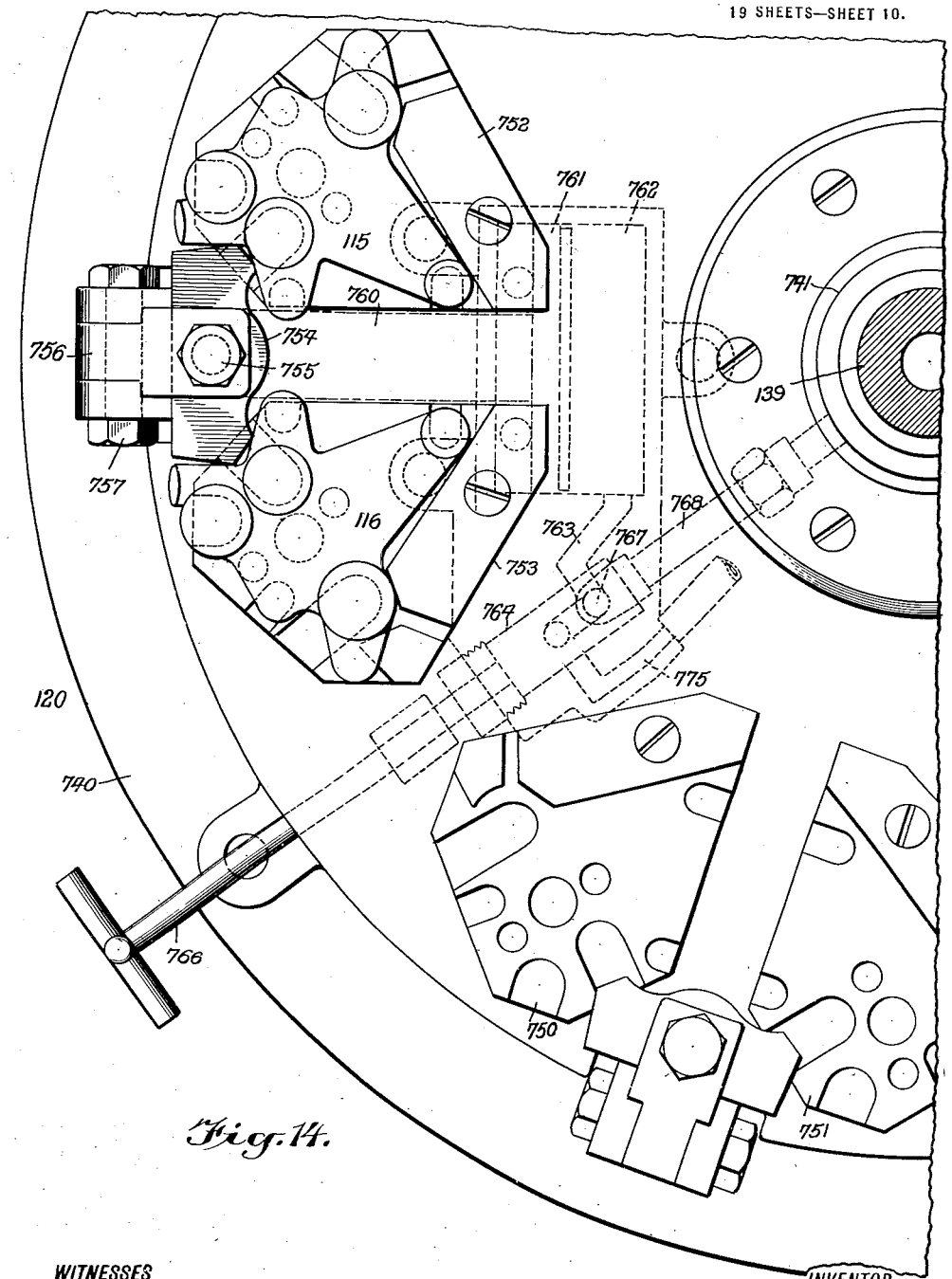
Figure 14 is an enlarged plan view of a portion of the turret and showing a pair of companion cam shaft brackets held in position thereon.

The work holding turret 120 (see Figures 1, 3, 4 and 14) may be of any approved construction, but is, however, preferably of the pneumatic type, and its detail construction forms no part of this invention. The body 740 is of circular shape and is provided with a hub 741 mounted to turn loosely on the supporting rod 139 of the tooling head 104. The hub 741 is mounted to turn in a suitable bearing 742 and the body 740 is supported on a suitable bearing 743, and the said bearings 742 and 743 are mounted on the table bracket 101, as plainly shown in Figure 4. On the top of the body 740 are arranged pairs of supports 750 and 751, one pair for each station and for supporting a pair of cam shaft brackets 115, 116. As these supports 750, 751 are especially built for accommodating a particular job such as the cam shaft brackets 115, 116 it is not deemed necessary to describe the same in detail as these supports vary according to the different kinds of work in hand at the time. However, the supports 750 and 751 are provided with raised portions 752 against which the brackets are clamped by a clamping member 754 engaging both brackets of a pair at a time. This clamping member 754 is mounted to swing on a vertical pivot 755 held on the upper end of a lever 756 fulcrumed at 757 on the body 740 (see Figures 3 and 4). The lower end of the lever 756 is pivotally connected with the outer end of a piston rod 760 of a piston 761 mounted to slide in a cylinder 762 mounted on the chuck body 740. The cylinder 762 is connected by a port 763 (see Figure 14) with a valve plug 764 mounted in a plug casing 765 attached to the body 740. The plug 764 is provided with a suitable handle 766 extending outward to within convenient reach of the operator in front of the machine whenever such handle comes around to the front station after leaving the fifth station. The valve plug 764 is provided with a port 767 adapted to connect the port 763 with a supply pipe 768 connected with a chamber 769 attached to the body 740 and through which extends centrally the supporting rod 139. The rod 139 is preferably made hollow and its lower end portion is connected by a hose or other connection 770 with a tank containing compressed air, and the said rod 139 is connected by a port 771 with the chamber 769 to supply the latter with compressed air. It will be noticed that when the plug 764 connects the ports 767 and 763 with each other then compressed air from the chamber 769 can pass by way of the supply pipe 768 and the plug 764 into the cylinder 762 to move the pistons 761 outward whereby a swinging movement is given to the lever 756 to move the clamping member 754 into firm contact with the cam shaft brackets 115, 116 to clamp the same against the raised portions 752, 753 of the supports 750, 751. On turning the plug 764 at the time it reaches the unloading and loading station the compressed air is cut off from the cylinder 762 and the latter is connected by way of the ports 763 and 767 with an exhaust port 775 to allow return movement of the piston 761 in the cylinder 762. It is understood that when the finished work reaches the unloading and loading station the cylinder 762 is relieved of its compressed air as described to enable the operator to move the clamping member 764 out of engagement with the finished cam shaft brackets 115, 116 to lift the latter off the supports 750, 751 and to place raw brackets to be tooled on the said supports, after which the operator again turns the plug 764 into operative position to allow air to pass into the cylinder 762 with a view to clamp the brackets 115, 116 in position on the supports, as above explained. It is understood that during the time the turret carries the pieces of work to the several stations II, III, IV, and V the work remains clamped in position and is unclamped only after the finished work moves from the last station to the unloading and loading station.

Indexing mechanism.

On the hub 742 of the body 740 of the turret 120 is keyed or otherwise secured a star wheel 800 (see Figures 4, 11 and 12). The star wheel 800 is provided with five radial slots 801 adapted to be successively engaged by a friction roller 802 mounted on the top of a disk 803 secured to the top of the worm wheel 630, previously mentioned, and attached to the cam 622 used for imparting a reciprocating motion to the crosshead 140. It will be noticed that by the arrangement described the star wheel 800 and consequently the turret 120 is given one-fifth of a revolution at each revolution of the cam 622, and this motion is given to the work holding turret 120 at the time the tooling head 104 moves into uppermost position. On the disk 803 is secured a detent engaging recesses 805 formed in the peripheral face of the star wheel 800 to periodically lock the star wheel against turning. On the peripheral face of the star wheel 803 is secured a cam 810. The uncovered portion of the said peripheral face and the said cam are adapted to be engaged by a friction roller 811 journaled at 812 on one end of an arm 813 secured on the lower end of a shaft 814 journaled in suitable bearings 815 arranged on the table bracket 101. The upper end of the shaft 814 is provided with an arm 816 having at its free end an elongated opening 817 engaged by a pin 818 riveted or otherwise fastened in a sliding locking bolt 819 mounted to slide in a suitable bearing 820 attached to the table bracket 101. The bolt 819 is adapted to engage at a time one of five notches 821 formed in a ring 822 bolted or otherwise secured to the under side of the turret 120, as plainly shown in Figure 4. The bolt 819 is provided with a depending pin 825 pressed on by a spring 826 held in the bearing 820 to move the bolt 819 into engagement with a registering notch 821 as soon as the friction roller 811 leaves the cam 810. It is understood that the cam 810 holds the bolt 819 in retracted position to allow intermittent turning of the work holding turret 120 by the friction roller 802 and the star wheel 805 as previously explained. When the friction roller 811 travels from the peripheral face of the disk 803 onto the cam 810, as shown in Figure 11, then the spring 826 is compressed by the bolt 819 moving into retracted position relative to the corresponding notch 821. It is expressly understood that after one-fifth of a revolution has been given to the work holding turret 120 then the latter is locked against rotation by the bolt 819 engaging the corresponding notch 821 in the locking ring 822.

Tool guides.

In order to accurately guide and steady the tools carried by the tool spindles 201 to 234 of the five groups of tool spindles 105, 106, 107 and 108 use is made of a guide in the form of a bracket 830 bolted or otherwise secured to the vertical guideway 103 (see Figures 1, 3, 23 and 24). The bracket 830 is provided at the left hand side with an opening 831 covered by a plate 832 provided with hardened guide thimbles 833, one for each of the tools on the tool spindles 201 and 210 of the group of tool spindles 105. The plate 832 is provided with bosses 834 engaging pins 835 attached to the bracket 830 to properly position the plate 832 on the bracket 830. Bolts 836 serve to fasten the plate 832 to the bracket 830. It is understood that the thimbles 833 are arranged in accurate alinement with the corresponding tool spindles 201 and 210, and in case the thimbles become worn out the plate 832 can be readily replaced by a new one. The tools for the spindles 211 and 216 for the group of tool spindles 106 are guided in hardened guide thimbles 840 directly attached to the bracket 830. In order to guide the tools for the spindles 217 to 226 for the group of tool spindles 107 use is made of hardened guide thimbles 841 arranged on a plate 842 similar to the plate 832 and extending over an opening 843 formed in the bracket 830. The plate 842 is guided by bosses 844 on pins 845 and is fastened by bolts 846 to the bracket 830, the same as the plate 832. In order to guide the tools for the spindles 227 to 234 of the group of tool spindles 108 use is made of hardened guide thimbles 850 attached to the right-hand side of the bracket 830. It will be noticed that by the use of the thimbles 833, 840 and 850 the tools for the several vertical spindles are properly guided to the work to insure accurate tooling of the work, that is, the cam shaft brackets 115 and 116.

In order to guide the drills 458 of the first set of sidewise extending spindles 450 and 451 use is made of thimbles 860 arranged in a bracket 861 fastened by bolts 862 to the under side of a yoke 863 attached to rods 864 having their inner ends engaging recesses 865 formed in the left-hand side of the bracket 830. The outer ends of the rods 864 are attached to lugs 866 forming parts of the housing 470 of the tooling head 109 (see Figure 3). It is understood that after the drills 458 of the spindles 450 and 451 have drilled the sidewise extending holes into the cam shaft brackets 115, 116, then these holes form guides for the drills 459, the countersinking tools 460 and the taps 461, and hence the said tools 459, 460 and 461 do not require any guiding means. The outer end of the bracket 861 is provided with pins 867 (see Figure 24) for steadying the spindles 450 and 451.

*Lubricating systems.*

In order to supply the tools at the work with a cooling liquid, such as a mixture of water and lime, and lubricant to the several mechanisms (with the exception of the differential gearing) arranged in the base 100, use is made of two pumps 870 and 871 (see Figures 1 and 27), preferably of the rotary type, and having a shaft 872 in common. The shaft 872 is driven from the main shaft 164 by the use of a sprocket chain 873 and sprocket wheels 874, 875, of which the sprocket wheel 874 is secured on the shaft 872 and the sprocket wheel 875 is attached to or forms part of the bevel gear wheel 165 attached to the shaft 164, as previously mentioned. The pump 870 is provided with a suction pipe 876 connected with a reservoir 877 formed in the base 100 and adapted to contain the cooling medium. The discharge pipe 878 of the pump 870 is provided with suitable delivery pipes (not shown) for directing the cooling medium onto the work at the tools carried by the spindles of the groups of tools spindles 105, 106, 107, and 108 and those in the tooling heads 109, 110, 111 and 112. For clearness sake, the delivery pipes have been omitted in the drawings. The cooling medium after having performed its function flows into an annular groove or channel 880 formed in the body 740 of the turret 120 (see Figures 4, 11 and 12) provided at the bottom with a number of outlets 881 covered by screens 882 to retain filings, chips and other extraneous matter. The outlets 881 discharge into an annular trough 883 formed on the table bracket 101, and the trough 883 is provided in its bottom with an outlet 884 registering with a channel 885 opening into the reservoir 877 to be returned by the pump 870 to the work and the tools. The lower portion of the base 100 adjacent the pump 871 forms a well for the lubricating oil drawn in by the suction pipe 890 of the pump 870 and discharged by the delivery pipe 891 into the upper portion of the base 100 to lubricate the several mechanisms located therein with the exception, perhaps of the differential gearing, the housing 563 of which is preferably filled with oil and the mechanism contained therein is lubricated by the splash system. In order to lubricate the mechanisms in the tooling head 104 use is preferably made of a rotary pump 895 (see Figure 3) driven by a suitable gearing from a gear wheel 896 (see Figure 20) in mesh with the gear wheel 257 of the gearset 196. The pump 895 has its suction pipe (not shown) extending into the lower portion of the tooling head 104 while its delivery pipe (not shown) extends upward and is provided with delivery branch pipes (not shown) for directing the lubricant to the several mechanisms in the tooling head 104. It is understood that the suction and delivery pipes of the pump 895 are not shown for clearness sake.

*General operation.*

The attendant of the machine is standing in front opposite the work holding turret 120 and during the time the latter is at rest the attendant removes the pair of finished cam shaft brackets 115 and 116 and places a pair of unfinished cam shaft brackets in position on the turret at the first or unloading and loading station and then locks the said pair of cam shaft brackets in position on the turret as above explained. This operation is repeated at the first station as each pair of finished brackets reaches the said station. When the machine is running the motor 160 drives the main shaft 164 which rotates the shaft 167 geared with the spindles 201 to 234 of the four groups of tool spindles 105, 106, 107 and 108 to continually rotate the said spindles in the same direction. The spindles 450 to 457 are also rotated by the gearing for the groups of spindles 105, 106, 107 and 108, as above explained. The differential gearing is driven from the motor driven shaft 164 and this gearing drives the actuating mechanism for the crosshead 140 to move the tooling head 104 up and down. During the downward movement of the tooling head 104 the rotating spindles mounted therein move with the said head and consequently their tools engage the pairs of cam shaft brackets 115, 116 at the several tooling stations II, III and IV and tool the work. At the same time, the spindles 450 to 457 of the tooling heads 109, 110, 111 and 112 are fed to the work to tool the same as previously explained, it being understood that this feeding of the spindles 450 to 457 is controlled by the downward movement of the tooling head 104. During the upward movement of the tooling head 104 the tools of the various spindles 201 and 234 are moved out of engagement with the work and the spindles 450 to 457 are during this return movement of the tooling head 104 moved out of engagement with the work and return to outermost normal position. It is understood that during the time the tools on the spindles 201 to 234 and the spindles 450 to 457 are in engagement with the work they are rotated at a slow speed by the differential gearing and this time is controlled by the cam 720 on the disk 722 driven from the shaft 651 of the differential gearing. It is understood that during the remaining portion of the return and initial downward movement of the tooling head 104 the latter is moved at a higher rate of speed and likewise the spindles 450 to 457 of the tooling heads 109, 110, 111 and 112. The cam groove 621 of the cam 622 is shaped (see Figure 4) so that the crosshead 140 remains at rest for a short time when at the end of its upward stroke thus providing ample time for the indexing mechanism to impart an intermittent turning movement to the turret 120. During the period of rest of the turret 120 sufficient time is given to the operator in charge of the machine for removing the finished pair of cam shaft brackets and replacing it by an unfinished pair. The unfinished pair of cam shaft brackets is carried by the turret 120 from the first or unloading and loading station or station I to station II and then the turret comes to rest. The tools on the group of spindles 201 to 210 and the tools 458 on the spindles 450, 451 now tool the said brackets, and when this has been done this pair of cam shaft brackets is carried to station III to be tooled thereat by the tools on the spindles 211 to 216, and the tools 459 of the spindles 452, 453, and after this operation is completed the same brackets are carried by the turret 120 to station IV at which the tools of the spindles 217 to 226 and the tools 460 of the spindles 454 and 455 do their work, and then the same pair of cam shaft brackets is carried by the turret 120 to station V at which the tools of the spindles 227 to 234 and the tapping tools 461 of the spindles 456, 457 complete the tooling operations of the said brackets, which at the next action of the chuck 120 are carried by the turret to station I in finished condition to be removed from the turret.

From the foregoing it will be seen that a large number of tooling operations are simultaneously carried on on four pairs of cam shaft brackets. It will be noticed that the machine is completely automatic and the work of loading and unloading the machine can be readily carried out by practically an unskilled workman as it is only necessary for the latter to manipulate a corresponding valve plug 764 at the time the handle 766 thereof is carried by the turret 120 from station V back to station I to unlock the finished pair of cam shaft brackets and to remove the same from the machine. It will further be noticed that the tooling operations are carried on in a predetermined sequence particularly as some of the tooling operations depend for accuracy on the accurate work done by previous tooling operations on this machine. Thus the drills 458, for instance, drill holes to a certain depth in the sides of the pair of brackets and these holes are subsequently deepened by the pair of drills 459 and the outer ends of these holes are countersunk by the tools 460 and the countersunk portions are subsequently tapped by the tapping tools 461. Likewise, a number of holes drilled in the pair of cam shaft brackets 115, 116 at stations II and III are subsequently reamed at stations IV and V and portions of the cam shaft brackets spot faced at one station are drilled at another station or vice versa. By providing accurate guides for the tools carried by the several spindles 201 to 234 and for the tools 458 absolutely accurate tooling work is done.

Although I have particularly shown and described an automatic chucking machine having a loading and unloading station and four tooling stations with the spindles of the different groups arranged in a predetermined manner for tooling two pairs of cam shaft brackets, it is evident that I do not limit myself to the number of tooling stations or to the particular arrangement of the spindles, both vertical and sidewise, at each tooling station, as the same may be varied according to the work to be done.

It is further understood that instead of two pieces of work at each station a single piece of work may be tooled at the different tooling stations by a corresponding arrangement of the spindles at each station.

It will be noticed that by the arrangement described a high speed automatic chucking machine is provided for carrying on a large number of tooling operations on the work which in the particular case shown and described is the production of about 114 finished brackets per hour.

Having thus described my invention, I claim as new and desire to secure by Letters Patent:—

1. In an automatic chucking machine, a turret rotating intermittently on a vertical axis and adapted to support a plurality of pieces of work in spaced relation, an up and down moving tooling head above the said turret and provided with groups of vertical tool carrying spindles adapted to tool the work vertically, a plurality of fixed tooling heads grouped around the said turret and each having sidewise extending tool carrying spindles adapted to tool the work sidewise, spindle driving means for the groups of spindles in the said up and down moving tooling head, driving means for the spindles in the fixed heads and geared with the said driving means for the said groups of spindles, and feeding means for the spindles in the said fixed heads and actuated by the said vertically moving tooling head.

2. In an automatic chucking machine, a turret rotating intermittently on a vertical axis and adapted to support a plurality of pieces of work, a tooling head having up and down movement toward and from the said turret, the said tooling head having groups of tool carrying spindles, fixed tooling heads grouped around the said turret and each having at least one tool carrying spindle extending sidewise, spindle driving means for rotating the tool carrying spindles in the said up and down moving tooling head, spindle driving means rotating the tool carrying spindles in the said fixed tooling heads from the said spindle driving means for the tool carrying spindles in the up and down moving tooling head, and spindle feeding means actuated by the said up and down moving tooling head for feeding the tool carrying spindles of the said fixed tooling heads.

3. In an automatic chucking machine, a movable tooling head and a fixed tooling head, tool carrying spindles mounted in the said heads at an angle one relative to the other, driving means driving the said spindles in the said movable tooling head, driving means driving the spindles in the said fixed tooling head and driven from the said first-named driving means, and feeding means for the spindle in the said fixed tooling head and actuated by the said movable tooling head.

4. In an automatic chucking machine, an up and down moving tooling head carrying a vertically disposed tool carrying spindle, a fixed tooling head carrying a sidewise extending tool carrying spindle, spindle driving means for rotating the said spindle in the said movable tooling head, driving means for driving the said spindle in the fixed tooling head and driven from the said first named driving means, and a feeding means for the spindle in the fixed tooling head and controlled by the said up and down moving tooling head.

5. In an automatic chucking machine, a turret rotating intermittently and adapted to support a plurality of pieces of work arranged in spaced relation to carry the same successively to different tooling stations, a tooling head mounted to move towards and from the said turret and provided with groups of tool carrying spindles adapted to tool the pieces of work facewise at the several stations, fixed tooling heads grouped around the said turret and having tool carrying spindles at an angle to the said groups of spindles and adapted to tool the pieces of work edgewise at the several stations, driving means rotating the said spindles simultaneously in the said movable tooling head, driving means rotating simultaneously the spindles in the said fixed tooling heads and driven from the said first-named driving means, and feeding means for the spindles of the said fixed tooling heads and driven from the said movable tooling head.

6. In an automatic chucking machine, a turret rotating intermittently and adapted to support a plurality of pieces of work arranged in spaced relation to carry the same successively to different tooling stations, a tooling head mounted to move toward and from the said turret and provided with groups of tool carrying spindles adapted to tool the pieces of work facewise at the several stations, fixed tooling heads grouped around the said turret and having tool carrying spindles at an angle to the said groups of spindles and adapted to tool the pieces of work edgewise at the several stations, a driven shaft extending through the said movable tooling head, gearsets mounted on the said movable tooling head and driven simultaneously from the said driven shaft, the said gearsets driving the said groups of spindles of the movable tooling head, driving means driven from the said gearsets and driving the spindle in the said fixed tooling heads, and feeding means for the spindles of the fixed tooling head and driven from the said movable tooling head.

7. In an automatic chucking machine, a turret rotating intermittently and adapted to support a plurality of pieces of work arranged in spaced relation to carry the same successively to different tooling stations, a tooling head mounted to move towards and from the said turret and provided with groups of tool carrying spindles adapted to tool the pieces of work facewise at the several stations, fixed tooling heads grouped around the said turret and having tool carrying spindles at an angle to the said groups of spindles and adapted to tool the pieces of work edgewise at the several stations, driving means rotating the said spindles simultaneously, feeding means for the spindles of the said tooling heads and driven from the said movable tooling head, actuating mechanism for moving the said movable tooling head up, and a differential gearing connected with the said actuating mechanism for moving the said movable tooling head at a slow speed while tooling and at a fast speed during the remainder of its movement.

8. In an automatic chucking machine, a turret having a hub and adapted to support a plurality of pieces of work, means imparting an intermittent rotary motion to the said turret, a tooling head mounted to move up and down above the said turret and provided with groups of tool carrying spindles adapted to tool the work at the time the turret is at rest, a supporting rod centrally attached at its upper end to the said tooling head, the said turret hub being mounted to turn on the said supporting rod, and raising and lowering means connected with the said supporting rod to move the latter and the tooling head up and down.

9. In an automatic chucking machine, a turret having a hub and adapted to support a plurality of pieces of work, means imparting an intermittent rotary motion to the said turret, a tooling head mounted to move up and down above the said turret and provided with groups of tool carrying spindles adapted to tool the work at the tim. the turret is at rest, a supporting rod centrally attached at its upper end to the said tooling head, the said turret hub being mounted to turn on the said supporting rod, a crosshead mounted to slide up and down and attached to the lower end of the said supporting rod, and a rotatable cam engaging the said crosshead to raise and lower the latter.

10. In an automatic chucking machine, a turret mounted to rotate intermittently on a vertical axis and adapted to support a plurality of pieces of work, a tooling head mounted to move up and down above the said turret and provided with groups of tool carrying spindles adapted to tool the pieces of work at the time the turret is at rest, a crosshead mounted to slide up and down and having a supporting rod provided with a threaded upper end, a nut mounted to turn on the said tooling head and in which screws the said threaded rod end, and means for turning the said nut to adjust the said tooling head on the supporting rod.

11. In an automatic chucking machine, a turret mounted to rotate intermittently on a vertical axis and adapted to support a plurality of pieces of work, a tooling head mounted to move up and down above the said turret and provided with groups of tool carrying spindles adapted to tool the pieces of work at the time the turret is at rest, a crosshead mounted to slide up and down and having a supporting rod provided with a threaded upper end, a nut mounted to turn on the said tooling head and in which screws the said threaded rod end, a gear wheel secured on the said nut, and a manually controlled shaft provided with a pinion in mesh with the said gear wheel to rotate the said nut for adjusting the tooling head on the said rod.

12. In an automatic chucking machine, a turret mounted to rotate intermittently on a vertical axis and adapted to support a plurality of pieces of work, a tooling head mounted to move up and down above the said turret and provided with groups of tool carrying spindles adapted to tool the pieces of work at the time the turret is at rest, a crosshead mounted to slide up and down and having a supporting rod supporting the said tooling head, means moving the said crosshead up and down, a driven shaft extending through the said tooling head, a gear wheel mounted to turn in the said tooling head and mounted to turn with and to slide on the said driven shaft, and gear sets mounted within said tooling head and driven from the said gear wheel, the said gearsets being connected with the groups of tool carrying spindles to rotate the same.

13. In an automatic chucking machine, a vertical guideway, a tooling head mounted to slide up and down on the said guideway and provided with groups of tool carrying spindles, a counterbalancing means connected with the said tooling head to counterbalance the latter, a supporting rod attached to and depending centrally from the said tooling head, actuating means connected with the said supporting rod to move the latter up and down, a work holding turret mounted to turn on the said supporting rod and adapted to support a plurality of pieces of work adapted to be tooled by the said group of tool carrying spindles, and actuating means connected with the said turret to intermittently rotate the same.

14. In an automatic chucking machine, a vertical guideway, a tooling head mounted to slide up and down on the said guideway, a counterbalancing means connected with the said tooling head to counterbalance the latter, a supporting rod connected centrally with the said tooling head, a crosshead on the said supporting rod and provided with a friction roller, and a driven cam engaging the said friction roller to move the said tooling head up and down.

15. In an automatic chucking machine, a vertical guideway, a tooling head mounted to slide up and down on the said guideway, a counterbalancing means connected with the said tooling head to counterbalance the latter, a supporting rod connected centrally with the said tooling head, actuating means connected with the said supporting rod to move the said tooling head up and down, and a differential gearing connected with the said actuating means to drive the latter alternately at high and low speeds.

16. In an automatic chucking machine, a vertical guideway, a tooling head mounted to slide up and down on the said guideway, a counterbalancing means connected with the said tooling head to counterbalance the latter, a supporting rod connected centrally with the said tooling head, actuating means connected with the said supporting rod to move the said tooling head up and down, a differential gearing connected with the said actuating means, and a cam controlled timing mechanism to drive the actuating means alternately at high and low speeds during different periods of time.

17. In an automatic chucking machine, a vertical guideway, a tooling head mounted to slide up and down on the said guideway, a counterbalancing means connected with the said tooling head to counterbalance the latter, a supporting rod connected centrally with the said tooling head, actuating means connected with the said supporting rod to move the said tooling head up and down, a differential gearing having a main shaft connected with the said actuating means, and a timing mechanism having a cam driven from the said main shaft and controlling the differential gearing to drive the actuating means alternately at high and low speeds.

18. In an automatic chucking machine, a vertical guideway, a tooling head mounted to slide up and down on the said guideway, a counterbalancing means connected with the said tooling head to counterbalance the latter, a supporting rod connected centrally with the said tooling head, actuating means connected with the said supporting rod to move the said tooling head up and down, a differential gearing having a main shaft connected with the said actuating means, and a timing mechanism having a cam driven from the said main shaft and controlling the differential gearing to drive the actuating means alternately at high and low speeds, the said cam having a removable and adjustable cam member to vary the speeds during different periods of time.

19. In an automatic chucking machine, a movable tooling head having spindles, a feed mechanism for the said tooling head and a differential gearing controlling the said feed mechanism, the said differential gearing having a main shaft, a clutch mechanism and a planetary gearing, and a cam controlling the said clutch mechanism to actuate the said feed mechanism at high and low speeds during different periods of time.

20. In an automatic chucking machine, a movable tooling head having spindles, a feed mechanism for the said tooling head and a differential gearing controlling the said feed mechanism, the said differential gearing having a main shaft, a clutch mechanism and a planetary gearing, and a cam controlling the said clutch mechanism to actuate the said feed mechanism, the said cam having a removable and adjustable cam member to vary the speeds at which the feeding mechanism is driven from the differential gearing and to vary the periods of time of the varying speeds.

21. In an automatic chucking machine, a vertical guideway, a counterbalanced tooling head mounted to slide up and down on the said guideway and provided with groups of vertical tool spindles grouped around the center of the tooling head, means driving the said spindles, a supporting rod centrally depending from the said tooling head, a cross-head on the lower end of the said supporting rod, a vertical guideway for the said cross-head to slide on, actuating means connected with the said cross-head to move the latter, the supporting rod and the tooling head up and down, a turret having a hub mounted to turn on the said supporting rod, and means imparting an intermittent rotary motion to the said turret.

22. In an automatic chucking machine, a vertical guideway, a counterbalanced tooling head mounted to slide up and down on the said guideway and provided with groups of vertical tool spindles grouped around the center of the tooling head, means driving the said spindles, a supporting rod centrally depending from the said tooling head, actuating means connected with the said supporting rod to move the said tooling head up and down, and a turret mounted to turn on the said supporting rod as an axis and provided with work holding means for supporting a plurality of pieces of work in register with the groups of spindles at the time the turret is at rest.

23. In an automatic chucking machine, a vertical guideway, a counterbalanced tooling head mounted to slide up and down on the said guideway and provided with groups of vertical tool spindles grouped around the center of the tooling head, means driving the said spindles, a supporting rod centrally depending from the said tooling head, actuating means connected with the said supporting rod to move the said tooling head up and down, a turret mounted to turn on the said supporting rod as an axis and provided with work holding means for supporting a plurality of pieces of work in register with the groups of spindles at the time the turret is at rest, and a plurality of fixed tooling heads grouped around the said turret and each having tool spindles extending sidewise and in register with the work at the time the turret is at rest.

24. In an automatic chucking machine, a vertical guideway, a counterbalanced tooling head mounted to slide up and down on the said guideway and provided with groups of vertical tool spindles grouped around the center of the tooling head, means driving the said spindles, a supporting rod centrally depending from the said tooling head, actuating means connected with the said supporting rod to move the said tooling head up and down, a turret mounted to turn on the said supporting rod as an axis and provided with work holding means for supporting a plurality of pieces of work in register with the groups of spindles at the time the turret is at rest, a plurality of fixed tooling heads grouped around the said turret and each having tool spindles extending sidewise and in register with the work at the time the turret is at rest, driving means for driving the said sidewise extending spindles in unison with the vertical tool spindles, and feeding means for feeding the said sidewise extending spindles from the said up and down tooling head.

25. In an automatic chucking machine, a fixed vertical guideway, a tooling head mounted to slide up and down on the guideway and provided with a tool spindle, a fixed vertically disposed rack adjacent the guideway, a gearing mounted in the said tooling head and having a gear wheel in mesh with the said rack, a fixed tooling head provided with a tool spindle, and a connecting feed gearing connecting the said gearing in the up and down moving tooling head with the tool spindle in the said fixed tooling head.

26. In an automatic chucking machine, a fixed vertical guideway, a tooling head mounted to slide up and down on the guideway and provided with a tool spindle, a fixed vertically disposed rack adjacent the guideway, a gearing mounted in the said tooling head and having a gear wheel in mesh with the said rack, a fixed tooling head provided with a tool spindle, a connecting feed gearing connecting the said gearing in the up and down moving tooling head with the tool spindle in the said fixed tooling head, a driving gearing for driving the spindle in the said up and down moving tooling head, and a connecting driving gearing connecting the said driving gearing in the up and down moving tooling head with the said spindle in the fixed tooling head.

27. In an automatic chucking machine, a movable tooling head provided with a spindle, a driving gearing for the said spindle, a fixed tooling head provided with a spindle at an angle to the spindle in the said movable tooling head, driving means for driving the said spindles in unison in the said movable tooling head, driving means rotating simultaneously the spindles in the said fixed tooling head and driven from the said first-named driving means, and feeding means for the spindle in the fixed tooling head and controlled by the movable tooling head.

28. In an automatic chucking machine, a movable tooling head provided with a spindle, a driving gearing for the said spindle, a fixed tooling head provided with a spindle at an angle to the spindle in the said movable tooling head, a driving gearing for the spindle in the said movable tooling head, and a connecting driving gearing for the said spindle in the fixed tooling head and driven from the said driving gearing in the movable tooling head.

29. In an automatic chucking machine, a vertical guideway, a counterbalanced tooling head mounted to slide up and down on the said guideway and provided with groups of vertical tool spindles grouped around the center of the tooling head, means driving the said spindles, a supporting rod centrally depending from the said tooling head, actuating means connected with the said supporting rod to move the said tooling head up and down, a turret mounted to turn on the said supporting rod as an axis and provided with work holding means for supporting a plurality of pieces of work in register with the groups of spindles at the time the turret is at rest, and an indexing mechanism operating in unison with the said actuating means for the supporting rod to intermittently rotate the said turret, the latter being a rest at the time the tooling head moves downward and the tools of the tooling spindles are in engagement with the work.

30. In an automatic chucking machine, a vertical guideway, a counterbalanced tooling head mounted to slide up and down on the said guideway and provided with groups of vertical tool spindles grouped around the center of the tooling head, means driving the said spindles, a supporting rod centrally depending from the said tooling head, actuating means connected with the said supporting rod to move the said tooling head up and down, a turret mounted to turn on the said supporting rod as an axis and provided with work holding means for supporting a plurality of pieces of work in register with the groups of spindles at the time the turret is at rest, a star wheel secured on the said turret and having its axis coinciding with the axis of the said supporting rod, and a wheel driven from the said actuating means and provided with driving means adapted to engage the star wheel to intermittently turn the same.

31. In an automatic chucking machine, a vertical guideway, a counterbalanced tooling head mounted to slide up and down on the said guideway and provided with groups of vertical tool spindles grouped around the center of the tooling head, means driving the said spindles, a supporting rod centrally depending from the said tooling head, actuating means connected with the said supporting rod to move the said tooling head up and down, a turret mounted to turn on the said supporting rod as an axis and provided with work holding means for supporting a plurality of pieces of work in register with the groups of spindles at the time the turret is at rest, a star wheel secured on the said turret and having its axis coinciding with that of the said supporting rod, the said star wheel having radial slots, a cam wheel driven from the said actuating means and provided with driving means adapted to engage the said slots to intermittently rotate the said star wheel and the said turret, a locking ring on the said turret and provided with notches, a spring-pressed bolt adapted to engage the said notches, and a bolt controlling device controlled by the said cam wheel and connected with the said bolt to move the latter into or out of locking position.

32. In an automatic chucking machine, a movable tooling head provided with a group of driven spindles, a fixed tooling head provided with a plurality of tool spindles, a driving gearing connecting the spindles with each other to rotate the same in unison, the said gearing having a driving shaft made in sections connected with each other by a universal coupling, and a driven shaft mounted on the said movable tooling head and driven in unison with the said spindles, the said driven shaft and the said driving shaft having a sliding and driving connection with each other.

33. In an automatic chucking machine, a movable tooling head provided with a group of driven spindles, a fixed tooling head provided with a plurality of tool spindles, a feed gearing connected with the said tool spindles in the fixed tooling head to feed the said tool spindles in unison, the said feed gearing having a feed shaft made in sections connected with each other by a universal coupling, and a feed gearing mounted in the said movable head and having a sliding and driving connection with the said feed shaft.

34. In an automatic chucking machine, a movable tooling head provided with a group of driven spindles, a fixed tooling head provided with a plurality of tool spindles, a feed gearing connected with the said tool spindles in the fixed tooling head to feed the said tool spindles in unison, the said feed gearing having a feed shaft made in sections connected with each other by a universal coupling, a feed gearing mounted in the said movable head and having a sliding and driving connection with the said feed shaft, a fixed rack, and a connecting gearing connecting the said rack with the said feed gearing in the said fixed tooling head to actuate the said feed gearing on the movement of the said movable tooling head.

35. In an automatic chucking machine, a fixed tooling head provided with two parallel tool spindles mounted to turn and to slide, a driving gearing mounted on the said tooling head and connected with the said tool spindles to rotate the same in unison, and a feed gearing mounted on the said tooling head and connected with the said tool spindles to simultaneously feed the same.

36. In an automatic chucking machine, a fixed tooling head provided with two parallel tool spindles mounted to turn and to slide, a driving gearing mounted on the said tooling head and connected with the said tool spindles to rotate the same in unison, a feed gearing mounted on the said tooling head and connected with the said tool spindles to simultaneously feed the same, a movable tooling head having a group of tool spindles, a driving gearing mounted in the said movable head and connected with the said driving gearing on the fixed tooling head, and a feed gearing mounted in the said movable tooling head and connected with the said feed gearing on the fixed tooling head.

37. In an automatic chucking machine, a turret adapted to carry the work, means intermittently rotating the said turret, a tooling head having groups of tool spindles carrying tools adapted to tool the work at the time the said turret is at rest, means moving the said tooling head up and down, and a fixed guide intermediate the said turret and the said tooling head, the said guide having groups of hardened guide thimbles engaged by the tools of the tool spindles of the corresponding groups of tool spindles.

38. In an automatic chucking machine, a turret adapted to carry the work, means intermittently rotating the said turret, a tooling head having groups of tool spindles carrying tools adapted to tool the work at the time the said turret is at rest, means moving the said tooling head up and down, and a fixed guide intermediate the said turret and the said tooling head, the said guide having groups of hardened guide thimbles engaged by the tools of the tool spindles of the corresponding groups of tool spindles, at least one of the said groups of thimbles being mounted on a plate forming a detachable member of the guide.

39. In an automatic chucking machine, a turret adapted to support the work and having an intermittent rotary motion, a plurality of fixed tooling heads grouped around the said turret and having tool spindles each carrying a tool, means turning the said spindles, means feeding the spindles to and from the work in register with the spindles at the time the turret is at rest, and a fixed guide intermediate the turret and the first of the said tooling heads and provided with hardened guide thimbles through which extend the said tools of the spindles of the first fixed tooling head.

40. In an automatic chucking machine, a fixed vertical guideway, a tooling head mounted to slide up and down on the said guideway and provided with groups of tool spindles, a fixed vertically disposed rack adjacent the movable tooling head, a feed gearing mounted in the said movable tooling head and provided with a gear wheel in mesh with the said rack, the said feed gearing having a plurality of vertical shafts journaled in the said movable tooling head, a plurality of fixed tooling heads provided with tool spindles at an angle to the tool spindles of the said movable tooling head, and feed connections driven from the said shafts of the movable tooling head and connected with the tool spindles in the said fixed tooling heads.

41. In an automatic chucking machine, a fixed vertical guideway, a tooling head mounted to slide up and down on the said guideway and provided with groups of tool spindles, a fixed vertically disposed rack adjacent the movable tooling head, a feed gearing mounted in the said movable tooling head and provided with a gear wheel in mesh with the said rack, the said feed gearing having a plurality of vertical shafts journaled in the said movable tooling head, a plurality of fixed tooling heads provided with tool spindles at an angle to the tool spindles of the said movable tooling head, feed connections driven from the said shafts of the movable tooling head and connected with the tool spindles in the said fixed tooling heads, sets of drive gears for the groups of tool spindles in the said movable tooling head, and sets of drive gears for the tool spindles in the said fixed tooling heads and driven from the drive gears in the movable tooling head.

HARRY A. SCHWARTZ.